United States Patent [19]
Tran

[11] Patent Number: 6,054,990
[45] Date of Patent: *Apr. 25, 2000

[54] COMPUTER SYSTEM WITH HANDWRITING ANNOTATION

[76] Inventor: Bao Q. Tran, 10206 Grove Glen, Houston, Tex. 77099

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,842

[22] Filed: Jul. 5, 1996

[51] Int. Cl.[7] ............................... G06F 3/00; G03B 29/00
[52] U.S. Cl. .................... 345/358; 345/179; 345/326; 396/313; 396/429
[58] Field of Search ................................ 345/173–183, 345/326, 329–332, 345, 358, 978; 348/64, 96, 231, 232, 552; 382/309, 311; 396/211, 310, 313, 321, 429

[56] References Cited

U.S. PATENT DOCUMENTS

| | | | |
|---|---|---|---|
| 3,590,703 | 7/1971 | Ono | 396/317 |
| 3,603,974 | 9/1971 | Copeland, Jr. | 346/23 |
| 3,843,956 | 10/1974 | Kauneckas | 396/318 |
| 4,714,962 | 12/1987 | Levine | 348/64 |
| 5,252,951 | 10/1993 | Tannenbaum et al. | 345/156 |
| 5,286,217 | 2/1994 | Rosenblatt | 396/281 |
| 5,309,555 | 5/1994 | Akins et al. | 345/330 |
| 5,323,203 | 6/1994 | Maruyama et al. | 396/57 |
| 5,376,981 | 12/1994 | Itoh | 396/319 |
| 5,392,447 | 2/1995 | Schlack et al. | 345/339 |
| 5,408,601 | 4/1995 | Nakamura et al. | 345/347 |
| 5,436,983 | 7/1995 | Bernzott et al. | 382/229 |

(List continued on next page.)

OTHER PUBLICATIONS

Jim Mallory, "Kodak exec shows snapshot of photography's future", Newsbytes, p. 1, Aug. 1994.

Justin Mullins, "Photographers Zoom in on smart film", New Scientist, v. 143, p. 22, Sep. 1994.

Martin Hershenson, "APS: the countdown begins", The Commercial Image, v.1, pp. 14–15, Nov. 1995.

Y. Hara, J. Yoshida, Digital Still Cameras are Making a Move, EET Jun. 3, 1996 p. 1,14.

R. Prabhakar, DCT Scaling Enables Universal MPEG Decoder, EDN Jun. 6, 1996, pp. 147–150.

D. Grosse, JPEG Parameters Determine Compression–System Performance, EDN Jan. 18, 1996, pp. 148–149.

W. Leonhard, SOHO Useability Test, PC Computing May 1996, pp. 284–288.

(List continued on next page.)

*Primary Examiner*—Raymond J. Bayerl
*Assistant Examiner*—X. L. Bautista
*Attorney, Agent, or Firm*—Kurt J. Brown

[57] ABSTRACT

The present invention provides a graphical data entry system for accepting and processing hand sketches and writings such that the user can quickly specify graphical objects in a drawing on a hand-held, mobile computer with a relatively compact screen. A viewing glass is provided by the graphical data entry system which enables the user to pan and zoom into a specific display region of the drawing. An object classification and recognition capability is provided to allow the present invention to recognize objects being sketched by the user and to convert the hand sketches into computer aided design (CAD)-like drawings. Further, the present invention integrates speech recognition and keyboard data entry to provide a user friendly computer system. Additionally, the graphical data entry system of the present invention can be used in conjunction with a camera to annotate pictures taken with the camera. The present invention can operate with digital cameras, APS-compatible cameras and conventional cameras which work with silver halide type films. Further, the drawing system of the present invention can be used in two-way messaging systems to support graphical paging requests and replies. The present invention also supports an intelligent agent operating with remote computers to locate and respond with responsive information, as specified using the graphical data entry system of the present invention.

10 Claims, 19 Drawing Sheets

U.S. PATENT DOCUMENTS

| | | | |
|---|---|---|---|
| 5,446,678 | 8/1995 | Saltzstein et al. | 395/200.76 |
| 5,459,458 | 10/1995 | Richardson et al. | 340/825.52 |
| 5,476,010 | 12/1995 | Fleming et al. | 73/620 |
| 5,479,228 | 12/1995 | Tanamura et al. | 396/319 |
| 5,481,255 | 1/1996 | Albert et al. | 340/825.55 |
| 5,490,241 | 2/1996 | Mallgren et al. | 345/440 |
| 5,510,606 | 4/1996 | Worthington et al. | 235/462.46 |
| 5,514,861 | 5/1996 | Swartz et al. | 235/462.44 |
| 5,546,145 | 8/1996 | Bernardi et al. | 396/312 |
| 5,553,225 | 9/1996 | Perry | 345/341 |
| 5,559,897 | 9/1996 | Brown et al. | 382/186 |
| 5,633,678 | 5/1997 | Parulski et al. | 348/232 |
| 5,666,186 | 9/1997 | Meyerhoefer et al. | 396/281 |
| 5,710,947 | 1/1998 | Teremy et al. | 396/26 |
| 5,717,967 | 2/1998 | Lee et al. | 396/313 |
| 5,719,969 | 2/1998 | Taguchi | 382/311 |
| 5,752,108 | 5/1998 | Sato | 396/310 |
| 5,752,114 | 5/1998 | Saito et al. | 396/429 |
| 5,784,504 | 7/1998 | Anderson et al. | 382/309 |
| 5,799,219 | 8/1998 | Moghadam et al. | 396/319 |
| 5,867,214 | 2/1999 | Anderson et al. | 348/231 |

OTHER PUBLICATIONS

Trends: The New PDA, PC. Magazine, Jun. 25, 1996, p. 31, (J. Matzkin).

Technology: The Sharper Image? Newsweek Jan. 12, 1996, p. 46 (J. Gordon, S. Miller).

J. Yoshida, Kodak Unwraps Advanced Photo System, EET Mar. 4, 1996, p. 16.

J. Gallant, CCD Cameras & Frame Grabbers, EDN Jan. 18, 1996, pp. 73–78.

V. McGugan, Agentworks, PCAI (Jul./Aug. 1996, pp. 24–27).

B. Schweber, Antennas: Initial in Linkks the Wireless Signal Chain, EDN Jun. 6, 1996, pp. 52–62.

Yang et al., An Intelligent Symbol Usage Assistant for CAD Systems.

COMPUTER SYSTEM WITH HANDWRITING ANNOTATION

FIELD OF THE INVENTION

This invention relates to a graphical data entry system, and more particularly, to a computerized sketching or drawing system.

BACKGROUND OF THE INVENTION

Historically, technical illustrations or drawings were typically created by draftspersons or graphic artists using standard drawing tools such as compasses, rulers, technical pens. French curves, and transfer screens. However, the manual approach was inefficient and difficult to modify, update or reproduce. The advent of computer technology made significant impact on the technical illustration field. Electronic systems, including computer aided design (CAD) and computer aided illustration systems such as those discussed in U.S. Pat. No. 5,408,601, entitled "GRAPHIC EDITOR," and in U.S. Pat. No. 5,490,241, entitled "INTERACTIVE COMPUTER GRAPHICS SYSTEM FOR MAKING PRECISE DRAWINGS," were designed to automate these tasks. Typically, these tools provided the user with a set of graphic primitives from which the user can generate more complicated constructs. The conventional graphical editing system was usually controlled by entering a command from a keyboard, by selecting a function key or icon, or by selecting a choice from a menu such as a fixed menu or a pop-up menu. For instance, to draw a line, the user clicked on a line icon and then specified the line by specifying two points using a mouse. Upon receipt of the second point designation, the system drew the line on the screen. To change the line length or direction, the user selected the line and moved the points specifying the line as necessary. Similarly, to specify a rectangle, the user merely selected a rectangle primitive, placed the primitive at the desired location, and finally move the end points of the rectangle to stretch the rectangle to the desired size using the mouse. In this manner, the anchor and control points were moved using the mouse to rapidly create geometric images and to manipulate the images by maneuvering their control points.

Although convenient, conventional computer aided design or illustration systems are not as intuitive to use as the pen and paper approach, as the editing process requires the user to remember various commands and object selection styles. Thus, the user must master many complex and arbitrary operations. For example, to find the proper commands, the user must traverse several nodes of a menu. By demanding that the draftsperson remember unique command and object selection sequence, the drawing system interface of the prior art reduces the efficiency of the draftsperson. Advances in computer hardware have not simplified life for users, since these advances have been largely employed to build more complex functions and modeling capability into the drawing screen with even more menus and sub-menus. The alternate solution of presenting a staggering array of incomprehensible icons is not also palatable to users. As such, many users only know a fraction of the available commands and features.

As the world advances toward the next computing millennium, users are being enticed to shift their processing from desktop based computers to portable computing appliances such as palmtop computers, wrist-watch computers, and eventually wearable computers. As a result of advances in microprocessor, memory and display technology, users are endowed with greater mobility and information on their fingertips. Modern portable computing appliances typically offer built-in applications which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. In addition to the built-in applications, add-on applications such as time and expense recording systems, filed by the present inventor in U.S. application Ser. No. 08/650,293 and entitled "TIME AND EXPENSE LOGGING SYSTEM", hereby incorporated by reference, can be added to increase the user's efficiency. Additionally, project planning tools, and CAD/CAM systems, among others, may be added to increase the functionality of portable computing appliances. Users benefit from these software, as the software allow users to be more productive when they travel as well as when they are in their offices.

Although simple drawing applications exist for portable computing appliances, they adopt the user interface of traditional computerized CAD systems or drawing software rather than employing interface objects which are familiar to the user so that the user can navigate the spreadsheet using intuitive knowledge rather than trained knowledge. Additionally. the functionality of portable computer-based spreadsheet software tends to be restricted due to the limited display screen. In general, more complex applications such as spreadsheets, databases, project planning tools, and CAD or drawing systems require large display areas to quickly and conveniently interact with users. However, portable computing appliances must balance the conflicting requirements of the readability of the displayed characters and the size of their display screens. On one hand, the portability requirement implies that the screen be small. On the other hand, the readability requirement pushes in the opposite direction and dictates that the display area be as large as possible. However, as computing appliances with large screens consume more power, more prone to breakage, and are less portable, most portable computers offer only a small display surface. The selection of a small display size restricts the user into making undesirable choices between displaying either larger characters or more information. For busy executives, attorneys, doctors and other professionals who are constantly on their feet and who do not have time to squint to decipher the miniaturized characters, such restrictions are overly burdensome. Thus, the display system needs to be portable, cost effective, and easy to use in comparison with the pen and paper approach before such computerized solution can replace the conventional pen and paper method. In addition to being as easy to use as the pen and paper approach, the portable computing appliance needs to provide information integration advantages over the cheaper pen and paper approach to further justify the expense associated with such electronic computer systems.

The ability to quickly create and attach text or graphical illustrations to a message, file, data set or recording media is needed in many applications, including photographic annotation and two-way communications. In the photography field, the annotation ability is needed by photographers to provide the capability of annotating each picture with words or graphical depiction regarding the circumstances and facts leading to the taking of the picture. The need arises as such annotation breathes life into the picture. Further, under certain occasions, the technical details underlying the photography session are needed. For example, when pictures are entered into a photography contest to be reviewed by the photographer's peers, certain camera settings used in producing a particular photographic effect are required with the submission of the photograph in these competitions. These technical data include the brightness, film speed, film type, shutter speed, f-stop setting, lens type, among others. Even when the photograph is not intended to be submitted in a photography contest, a detailed record of the photographic settings is important in many situations as professional photographers will photograph the same scene a number of times using different shutter speeds and aperture or f-stop settings. Additionally, amateur and professional photographers often desire to save comments associated with each picture such as the location, scenery, time and occasion for such photograph. Although text description is adequate for most situations, in certain instances, the ability to generate a drawing or illustration in conjunction with the photograph is highly desirable. These instances include the mapping of locations of sites along with the background scenery picture for space planners, utility workers, accident reconstructors, appraisers, inspectors, and architects, among others. In sum, in addition to business related reasons for annotating pictures, the availability of a picture description can considerably enhance the viewing pleasure of the picture for the viewing audience not privy to the logic or goal behind the taking of the pictures, or for photographers with poor recollections.

Conventionally, the photographer manually records the camera settings and annotations such as text and graphical data on a piece of paper and subsequently transfers the hand-recorded data onto the prints after they have been developed from negatives. Alternatively, the photographer can verbally record the comment utilizing a cassette recorder or the like and subsequently can transcribe the recording onto the picture or the sleeve of the associated negative. Naturally, the manual recording procedure is cumbersome and in many cases results in error in associating a particular data record with its corresponding negative or print. The use of separate written/dictated annotations is inherently disadvantageous because the annotations cannot be immediately attached to the appropriate negatives at the time of exposure. As these annotations need to be keyed to the photographs, the photographer may subsequently have a difficult time in properly associating the annotations with the photographs.

Although most components of the camera such as the lens, film winder, flash and metering equipment have improved greatly since the Daguerreotype of 1839, the tools for recording camera settings and annotating photographs have not advanced as rapidly. U.S. Pat. No. 3,590,703, issued Jul. 6, 1971 to Shigeo Ono, discloses an apparatus which automatically records shutter speed and lens aperture settings on film. This apparatus includes a complex optical and mechanical arrangement involving a large number of moving parts and is suitable for use with only a very limited selection of cameras. As a complex mechanical apparatus, the device disclosed in this patent must be built into the very heart of a camera during its manufacture, thereby rendering it difficult to service and impractical to install on existing cameras. Furthermore, the large number of parts and optical components add a great deal of highly undesirable additional weight to a camera. In addition, the cost of the precision parts involved is quite high, substantially increasing the manufacturing cost of a camera incorporating the apparatus.

Other devices for recording data on film strips are disclosed in U.S. Pat. No. 3,029,717, issued Apr. 17, 1962 to Hildebrandt and U.S. Pat. No. 3,603,974, issued Sep. 7, 1971 to Copeland, Jr. The devices disclosed in these patents employ electroluminescent techniques for recording data on photographic film in lieu of the complicated mechanical and optical system disclosed in Ono. The systems disclosed in Hildebrandt and Copeland, Jr. record only timing signals and the like on film, and are thus directed primarily in high-speed motion picture devices where such timing signals are important.

U.S. Pat. No. 3,843,956, issued to John J. Kauneckas, discloses the mounting of a light emitting diode display in a camera back such that the light emitting diodes engage edge portions of film within the camera. A switching system for controlling the light emitting diode display is coupled to the aperture and shutter speed adjusting mechanisms of the camera whereby the light emitting diode display is automatically adjusted to record the appropriate camera settings on edge portions of the film. However, the Kauneckas system is still quite complicated to manufacture and is incapable of recording parameters other than those that it has been designed for, namely the aperture and shutter speed settings.

Recently, a new consumer photography standard named Advanced Photo System (APS) has been developed which offers the ability to record certain camera settings and, using a keyboard, the ability to record comments from the photographer. U.S. Pat. Nos. 4,864,322 and 5,479,228 relate to an APS type of camera in which a film having a magnetic memory portion is used and information such as year, month, and day, shutter speed and aperture value can be written on or, if necessary, read from this magnetic memory portion by means of a magnetic head, or information written in advance such as the ISO and the specified number of film frames is read from the same. Also, various kinds of data which are recorded on the magnetic memory portion as mentioned above are imprinted together with an image such as a person's image, if desired, when the film is printed. Although a limited voice sample can be recorded on the magnetic memory portion, as a practical matter, the audio data recorded is limited by the relatively small space of the magnetic memory portion of the film.

An alternative to annotating the APS picture with the sound clip is to type in the description to be recorded on the magnetic memory portion of the film by means of a keyboard. The keyboard may be mounted internally or externally to the camera. In the event of an internally mounted keyboard, the keyboard may be a rotary, dial-in type camera to conserve space on the camera or may be a chicklet type found in palmtop computers. However, the miniature keyboard is inconvenient to use due to its small size. The conventional keyboard is relatively bulky and is undesirable as a part of the photography equipment. Further, the use of the keyboard forces the user to focus on his or her typing skill rather than the picture-taking process. Hence, critical shots may be missed while the photographer fiddles with the keyboard. In sum, existing cameras do not offer the ability to conveniently and quickly record data such as aperture settings and shutter speeds, free-form comments and/or drawings/sketches in conjunction with photographic negatives as they are exposed, thereby eliminating the potential errors and time consuming effort involved in manually recording and organizing/matching such data with the appropriate negative. Further, existing cameras do not offer a light weight and reliable solution for recording camera settings and drawing/text annotations on the film.

The ability to annotate a message with drawings is also important in the communications applications in the two-way messaging industry and the cellular communications industry. Recent developments in portable communication systems have enabled portable data computers systems to provide data message communication capability over conventional radio frequency (RF) channels. As is known in the art, such RF data communication systems have a base station with full duplex capability, a network control processor, a front end to a host system computer, and one or more mobile portable computers operating in half-duplex mode. As noted in U.S. Pat. No. 5,459,458, entitled "VIRTUAL TWO-WAY COMMUNICATION DEVICE FOR GENERAL PURPOSE DATA TERMINAL", it is desirable to incorporate paging-type functionality with portable computers, personal intelligent communicators and the like to permit a single device to offer both paging, data communication and computing capabilities. However, existing two-way communication devices cannot support graphical data entry, either from a page originator or a page respondent. The ability to transmit and reply with graphical and text information would allow users to more effectively communicate or to browse information using two-way communication devices or cellular phones.

SUMMARY OF THE INVENTION

The present invention provides a graphical data entry system for accepting and processing hand sketches and writings such that the user can quickly specify graphical objects in a drawing on a hand-held, mobile computer with a relatively compact screen. A viewing glass is provided by the graphical data entry system which enables the user to pan and zoom into a specific display region of the drawing. An object classification and recognition capability is provided to allow the present invention to recognize objects being sketched by the user and to convert the hand sketches into CAD-like drawings. Further, the present invention integrates speech recognition and keyboard data entry to provide a user friendly computer system.

Additionally, the graphical data entry system of the present invention can be used in conjunction with a camera to annotate pictures taken with the camera. The present invention can operate with digital cameras, APS-compatible cameras and conventional cameras which work with silver halide type films. Further, the drawing system of the present invention can be used in two-way messaging systems to support graphical paging requests and replies. The present invention also supports an intelligent agent operating with the computer to locate responsive information which is specified by the graphical data entry system of the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE INVENTION

Figure 1:
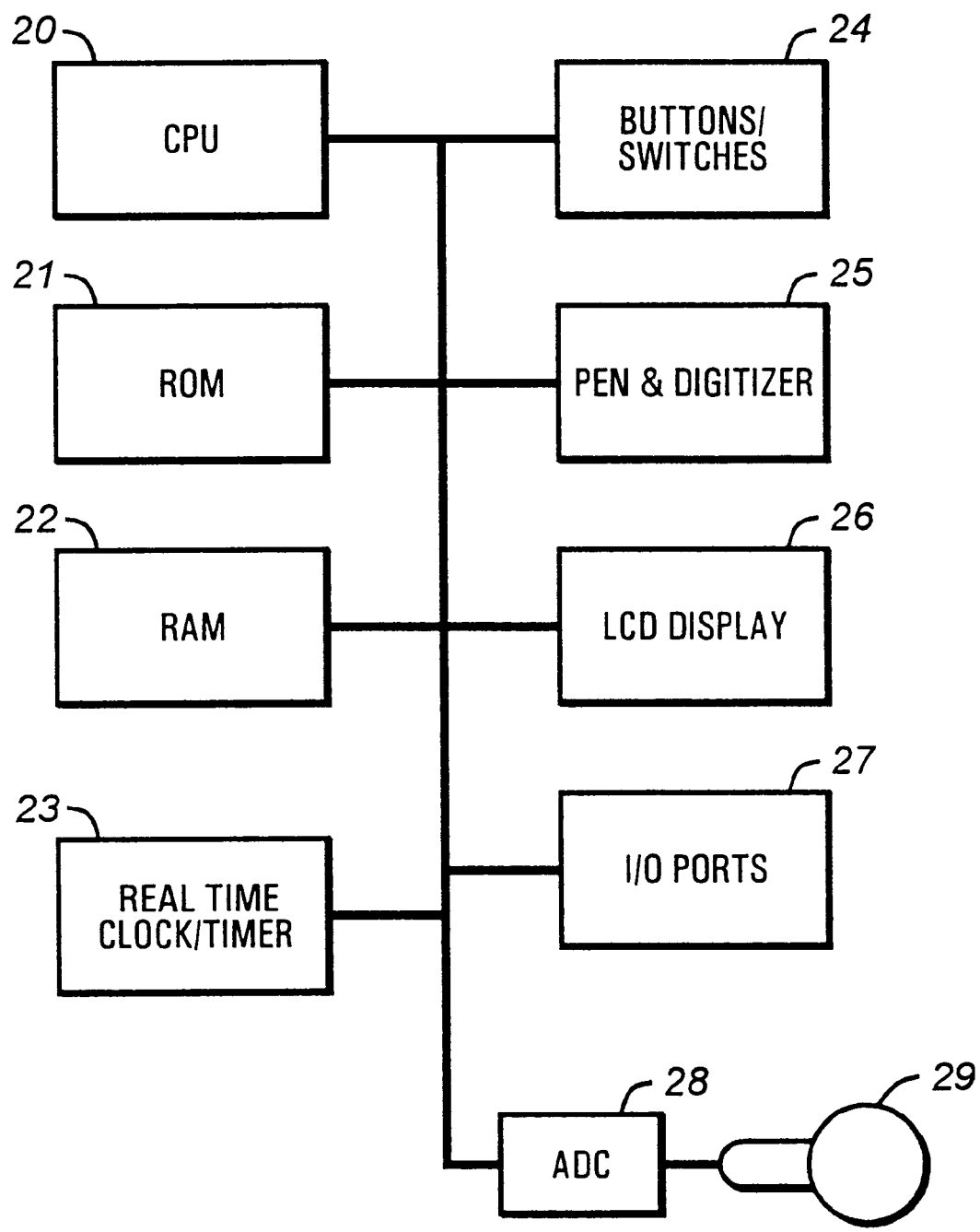
FIG. 1 is a block diagram of a computer system for sketching drawings in accordance with the present invention.

FIG. 1 illustrates the computer system of the present invention for recording sketching drawings. The computer system is preferably housed in a small, rectangular enclosure. Referring now to FIG. 1, a general purpose architecture for sketching drawings by writing or speaking to the computer system is illustrated. In FIG. 1, a processor 20 or central processing unit (CPU) provides the processing capability for the sketching system of the present invention. The processor 20 can be a reduced instruction set computer (RISC) processor or a complex instruction set computer (CISC) processor. Preferably, the processor 20 is a low power CPU.

The processor 20 is connected to a read-only-memory (ROM) 21 for receiving executable instructions as well as certain predefined data and variables. The processor 20 is also connected to a random access memory (RAM) 22 for storing various run-time variables and data arrays, among others. The RAM 22 is sufficient to store user application programs and data. In this instance, the RAM 22 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 21 for data back-up purposes. The RAM 22 stores a database of the drawings of present invention, among others.

The processor 20 is also connected to a real-time clock/timer 23 which tracks time. The clock/timer 23 can be a dedicated integrated circuit for tracking the real-time clock data, or alternatively, the clock/timer 23 can be a software clock where time is tracked based on the clock signal clocking the processor 20. In the event that the clockltimer 23 is software-based, it is preferred that the software clock/timer be interrupt driven to minimize the CPU loading. However, even an interrupt-driven software clock/timer 23 requires certain CPU overhead in tracking time. Thus, the real-time clock/timer integrated circuit 23 is preferable where high processing performance is needed.

Further, the timer portion of the clock/timer 23 can measure a duration count spanning one or more start times and completion times, as activated by the user. The timer portion has a duration count register which is cleared upon the start of each task to be timed. Further the timer portion of the clock/timer 23 has an active state and a passive state. During operation, when the user toggles the timer portion into the active state, the duration count register is incremented. When the user toggles the timer portion into the suspended state, the duration count is preserved but not incremented. Finally, when the user completes a particular task, the value of the duration count register is indicated and stored in a database to track time spent on a particular task.

The computer system of the present invention receives instructions from the user via one or more switches such as push-button switches 24. Further, in one embodiment where the computer accepts handwritings as an input medium from the user, a combination pen/digitizer unit 25, and a display LCD panel 26 having a viewing screen exposed along one of the planar sides of the enclosure are provided. The assembly combination of the pen/digitizer 25 and the LCD panel 26 serves as an input/output device. When operating as an output device, the screen displays computer-generated images developed by the CPU 20. The LCD panel 26 also provides visual feedback to the user when one or more application software execute. When operating as an input device, the display assembly senses the position of the tip of the pen or stylus on the viewing screen and provides this information to the computer's processor 20. Certain display assemblies can also sense the pressure of the stylus on the screen to provide further information to the CPU 20.

This embodiment accepts pen strokes from the user using a stylus or pen which is positioned over a digitizer. As the user "writes," the position of the pen is sensed by the digitizer of the pen/digitizer unit 25 via an electromagnetic field as the user writes information to the data logger computer system. The digitizer portion of the pen/digitizer unit 25 converts the position information to graphic data that are transferred to a graphic processing software of the data logger computer system. The data entry/display assembly of pen-based computer systems permits the user to operate the data logging computer system as an electronic notepad. For example, graphical images can be input into the pen-based computer by merely moving the stylus over the surface of the screen. As the CPU 20 senses the position and movement of the stylus, it generates a corresponding image on the screen to create the illusion that the pen or stylus is drawing the image directly upon the screen. The data on the position and movement of the stylus is also provided to a handwriting recognition software, which is stored in the ROM 21 and/or the RAM 22. The handwriting recognizer suitably converts the written instructions from the user into text data suitable for saving time and expense information. The process of converting the pen strokes into equivalent characters and/or drawing vectors using the handwriting recognizer is described below.

With suitable recognition software, text and numeric information can also be entered into the pen-based computer system in a similar fashion. For example, U.S. Pat. No. 5,463,696, issued on Oct. 31, 1995 to Beernink et al., and hereby incorporated by reference, discloses a technique for analyzing and interpreting cursive user inputs to a computer, such as strokes or key depressions to the computer system. Inputs to the system are received at a user interface, such as a dual function display/input screen from users in the form of pen strokes or gestures. A database stores cursive input data strokes and hypotheses regarding possible interpretations of the strokes. Recognition of the input strokes and recognition of higher level combinations of strokes forming characters and words is performed using recognizers, or recognition domains, each of which performs a particular recognition task. A controller is provided for controlling the hypotheses database and for scheduling the recognition tasks in the recognition domains. Arbitration resolves conflicts among competing hypotheses associated with each interpretation. The recognition domains, or recognizers generate two or more competing interpretations for the same input. The recognizers use a data structure called a unit, where a unit is a set of subhypotheses together with all their interpretations generated by a single recognizer.

In Beernink, the handwriting recognizer operates at a first level for identifying one or more groups of related subhypotheses using grouping knowledge. These grouped subhypotheses generate a unit with no interpretations for each group and store the unit in the database in what is called a piece-pool memory. The Beernink recognizer has a second level of operation where each unit generated in the grouping stage is classified to provide the unit with one or more interpretations. The classified units are stored in a unit pool memory. Two or more interpretations of the input data are combined in a hierarchical structure according to a predetermined scheme in successive steps to form higher level interpretations.

Although the Beernink recognizer is flexible and does not require that the user learns special gestures, its accuracy is not perfect. Because the letters in a cursive-lettered word are connected, the recognizer must guess at how to segment the strokes into individual characters. Since ambiguities exist even in stellar samples of penmanship, cursive handwriting recognizers such as those in Beernink face a challenging task in deciphering handwritings. For example, handwriting recognizer have difficulties in trying to determine where a cursive lower-case "n" and "m" begin and end when the two letters, distinguishable from one another only by their number of humps, are strung together in a word. The handwriting recognizer tackles such ambiguities by looking in its dictionary-to determine, for instance which words have "m" before "n" and which have "n" before "m." The user can improve accuracy by writing characters further apart than usual, but that is inconvenient and contrary to the way humans write.

Preferably, the handwriting recognizer of the present invention recognizes non-cursive characters. Unlike the Beemink approach to recognizing handwriting in which the user can print or write cursively, the non-cursive handwriting recognizer requires the user to learn to print characters in its fixed style using a basic character set, preferably a 36-character alphanumeric character set. In addition to the basic 26 letters and 10 digits, the non-cursive handwriting recognizer includes multistep pen strokes that can be used for punctuation, diacritical marks, and capitalization. Preferably, the non-cursive handwriting recognizer is a software module called GRAFFITI, commercially available from U.S. Robotics, Palm Computing Division, located in Los Altos, Calif. Each letter in the non-cursive alphabet is a streamlined version of the standard block character—the letter A, for example, looks like a pointy croquet hoop, and the hoop must be started at the dot indicator at the lower right corner—as shown below:

The Graffiti Alphabet

| Letter | Strokes | Letter | Strokes |
|---|---|---|---|
| A | ∧ | N | N |
| B | B  B | O | O  O |
| C | C | P | P  P |
| D | D  D | Q | Q |
| E | E | R | R  R |
| F | F  F | S | S |
| G | G  G | T | T |
| H | h | U | U |
| I | I | V | V  V |
| J | J | W | W |
| K | ⤳ | X | X  X |
| L | L | Y | Y  Y |
| M | M  M | Z | Z |

| | | | |
|---|---|---|---|
| Space | — | Back Space | → |
| Carriage Return | ⤶ | Period | tap twice |

Graffiti Numbers

| Number | Strokes | Number | Strokes |
|---|---|---|---|
| 0 | O  O | 5 | 5  5 |
| 1 | 1 | 6 | 6 |
| 2 | 2 | 7 | 7 |
| 3 | 3 | 8 | 8  8 |
| 4 | L | 9 | 9 |

| Symbol | Stroke | Symbol | Stroke |
|---|---|---|---|
| Period | . | Dash | — |
| Comma | , | Left Paren | (  ( |
| Apostrophe | ' | Right Paren | )  ) |
| Question | ? | Slash | /  / |
| Exclamation | ! | Dollar | $  $ |

| . | ™ | ® | © | ' | , | " | " |
|---|---|---|---|---|---|---|---|
| • | M | R | C | Γ | ⌐ | N | N |

| § | ° | + | − | × | ÷ | = | ¢ |
|---|---|---|---|---|---|---|---|
| S | O | ⤳ | — | / | ÷ | Z | C |

| ¥ | £ | ¿ | ¡ | β | μ | ∫ | ø |
|---|---|---|---|---|---|---|---|
| Y | L | L | 1 | B | M | S | Q |

| @ | # | % | ^ | & | ★ | < | > |
|---|---|---|---|---|---|---|---|
| O | N | % | ∧ | & | ⤳ | < | > |

| − | + | = | \| | \ | { | } | |
|---|---|---|---|---|---|---|---|
| — | ⤳ | Z | \| | \ | E | 3 | |

| [ | ] | ~ | ' | ; | : | " | tab |
|---|---|---|---|---|---|---|---|
| E | 3 | N | \ | / | ∶ | N | Γ |

By restricting the way the user writes, the non-cursive handwriting recognizer achieves a more perfect recognition and, as with stenography, supports an alphabet consisting of characters that can be written much more quickly than conventional ones.

Alternatively, voice recognition can be used in conjunction with and/or replace the handwriting recognizer of the present invention. As shown in FIG. 1, a microphone 29 is connected to an analog to digital converter (ADC) 28 which interfaces with the central processing unit (CPU) 20. A speech recognizer is stored in the ROM 21 and/or the RAM 22. The speech recognizer accepts the digitized speech from the ADC 28 and converts the speech into the equivalent text. As disclosed in U.S. application Ser. No. 08/461,646, filed Jun. 5, 1995 by the present inventor and hereby incorporated by reference, the user's speech signal is next presented to a voice feature extractor which extracts features using linear predictive coding, fast Fourier transform, auditory model, fractal model, wavelet model, or combinations thereof. The input speech signal is compared with word models stored in a dictionary using a template matcher, a fuzzy logic matcher, a neural network, a dynamic programming system, a hidden Markov model (HMM), or combinations thereof. The word model is stored in a dictionary with an entry for each word, each entry having word labels and a context guide. Next, a word preselector receives the output of the voice feature extractor and queries the dictionary to compile a list of candidate words with the most similar phonetic labels. These candidate words are presented to a syntax checker for selecting a first representative word from the candidate words, as ranked by the context guide and the grammar structure, among others. The user can accept or reject the first representative word via a voice user interface. If rejected, the voice user interface presents the next likely word selected from the candidate words. If all the candidates are rejected by the user or if the word does not exist in the dictionary, the system can generate a predicted word based on the labels. Finally, the voice recognizer also allows the user to manually enter the word or spell the word out for the system. In this manner, a robust and efficient human-machine interface is provided for recognizing speaker independent, continuous speech and for converting the verbal instructions from the user into text data suitable for capturing time and expense information.

The computer system is connected to a two-way communication device 9 for receiving instructions over the narrowband radio waves. Preferably, the two-way communication device 9 is a pager where the user can receive as well as transmit messages. The two-way communication device supports a Telocator Data Protocol by the Personal Communications Association for forwarding binary data to mobile computers. The standard facilitates transmission of images and faxes over paging and narrowband PCS networks. Alternatively, the two-way communication device 9 can be substituted with a cellular telephone, whose block diagram and operation are discussed in detail in the previously incorporated-by-reference U.S. application Ser. No. 08/461,646.

The computer system is also connected to one or more input/output (I/O) ports 27 which allows the CPU 20 to communicate with a host computer for data archival purposes. Each of the I/O ports 27 may be a parallel port, a serial port, a PCMCIA port, or alternatively, a proprietary port to enable the computer system to dock with the host computer. After docking, the I/O ports 27 and software located on the host computer supports the automatic synchronization of data between the computer system and the host computer. During operation, the synchronization software runs in the background mode on the host computer and listens for a synchronization request or command from the computer system of the present invention. Changes made on the computer system and the host computer will be reflected on both systems after synchronization. Preferably, the synchronization software only synchronizes the portions of the files that have been modified to reduce the updating times. In addition to supporting the docking function, the I/O port 27 is adapted to be connected to a fax-modem 80 which is adapted to receive information over the phone line or over the radio frequencies (wireless modem) and allow the user to access information remotely. Further, the modem may serve as part of a wide-area-network to allow the user to access additional information. The fax-modem can receive drawings and text annotations from the user and send the information over a transmission medium such as the telephone network or the wireless network to transmit the drawings/text to another modem or facsimile receiver, allowing the user to transmit information to the remote site on demand. The fax-modem 80 can be implemented in hardware or in software with a few components such as a DAA, as is known in the art. Alternatively, the fax-modem device 80 can be a two-way communication device which can receive text messages and graphics transmitted via radio frequency to the user for on-the-spot receipt of messages.

Figure 2A:
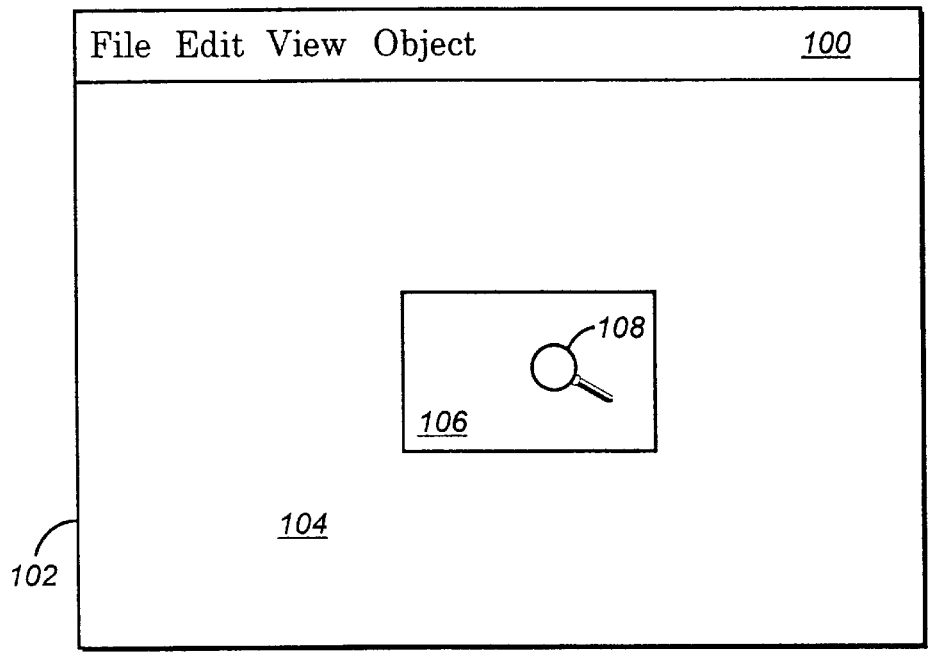
FIG. 2 is a diagram illustrating the sketching system user interface showing a magnifier and a corresponding zoom window.
Figure 2B:
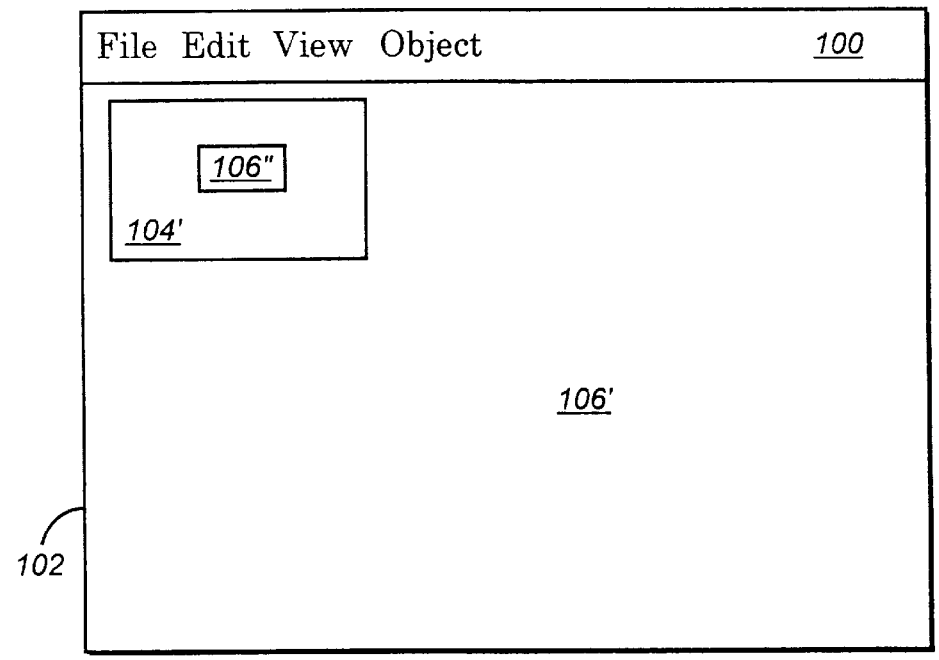

As indicated earlier, a number of software modules may reside in the RAM 22 to provide added functionality to the portable computing appliance. For instance, the portable computing appliance may provide a spreadsheet to support number intensive data analysis. Additionally, the sketching system of the present invention may be provided to support fast, convenient and accurate annotated drawings in the field. In a palmtop computer, the display 26 is relatively small and can display in full only small sketches. Thus, the routine of FIG. 2 causes the display 26 to selectively focus in on objects being edited. In FIG. 2. the user interface showing the magnifier and the zoom window generated by the operation of the magnifier is shown. In FIG. 2, the menu 100 allows the user to control the sketching system. Preferably, the menu 100 is a pull-down menu with a number of choices, including File, Edit. Object and View. The File menu selection allows the user to open a new or existing drawing, close one or all outstanding drawings, save the drawing in a file, import and export files, or exit the sketching system. The Edit menu selection allows the user to undo a previous operation, redo a previous operation, copy one or more selected objects cut one or more selected objects, paste the previously copied object(s), flip one or more selected objects, rotate one or more selected objects, insert between two objects, delete one or more selected objects, or find and replace one or more selected objects. The View menu selection allows the user to view the drawing in full or apply a magnifier to zoom in and out of a selected portion of the drawing. The Object menu selection allows the user to draw as objects an arc, a circle, a closed spline, an ellipse, a polyline, a polygon, a spline and text.

Underneath the menu 100 is an outline 102 which fences in a drawing area 104 where the user can sketch the illustration or drawing. Further, upon selecting the magnifier option from the View menu, a magnifier 108 is displayed whenever the pen input device touches the LCD screen 26 of the computer system. Additionally, a zoomed drawing area 106 is displayed along with the movement of the pen input device and the magnifier 108. When the user twice depresses (double clicks) the pen with the magnifier icon, the sketching system enters into a zoomed viewing mode, as shown in the bottom of FIG. 2 and described below.

Turning now to the bottom of FIG. 2, the result of activating the magnifier 108 is illustrated. From the top drawing in FIG. 2, upon depressing twice (double clicking) the pen when it is in the magnifier view mode, the zoomed drawing area 106 is enlarged into an enlarged zoomed drawing area 106' which occupies the space formerly belonging to the drawing area 104. The enlarged area 106' provides the user with a enlarged view of the object(s) being edited, which is more comfortable to review. To provide the user with a perspective of the particular portion of the drawing which he or she is working on, a miniaturized illustration 104' of the entire drawing is shown as a floating insert or a draggable window which is shown at the top left corner of the enlarged zoomed drawing area 106' of FIG. 2. The floating insert or draggable window showing the miniaturized illustration 104' may be freely moved within the enlarged zoomed area 106'. The miniaturized illustration 105 provides a bird's eye view of the entire drawing and further shows an outline 106" of the zoomed drawing area 106 or the enlarged zoomed drawing area 106'. The outline 106" may be moved to scroll around the drawing 104'. When the outline 106" is moved, the display region 106' is also updated to reflect the objects located at the current position of the outline 106".

The outline 106" also has four sides which can be adjusted to adjust the zoom ratio of the objects shown on the enlarged zoomed drawing area 106'. Thus, by adjusting the dimension of the outline 106", the user can vary the enlargement view on the area 106'. Thus. the magnifier 108 and the miniaturized illustration 104' balances between the need for showing the entire drawing with the limited display region afforded by the portable computing appliance. Upon completion of the zoomed viewing sequence, the user can select the full drawing view option from the Edit menu to display the entire drawing on the screen.

Figure 3:
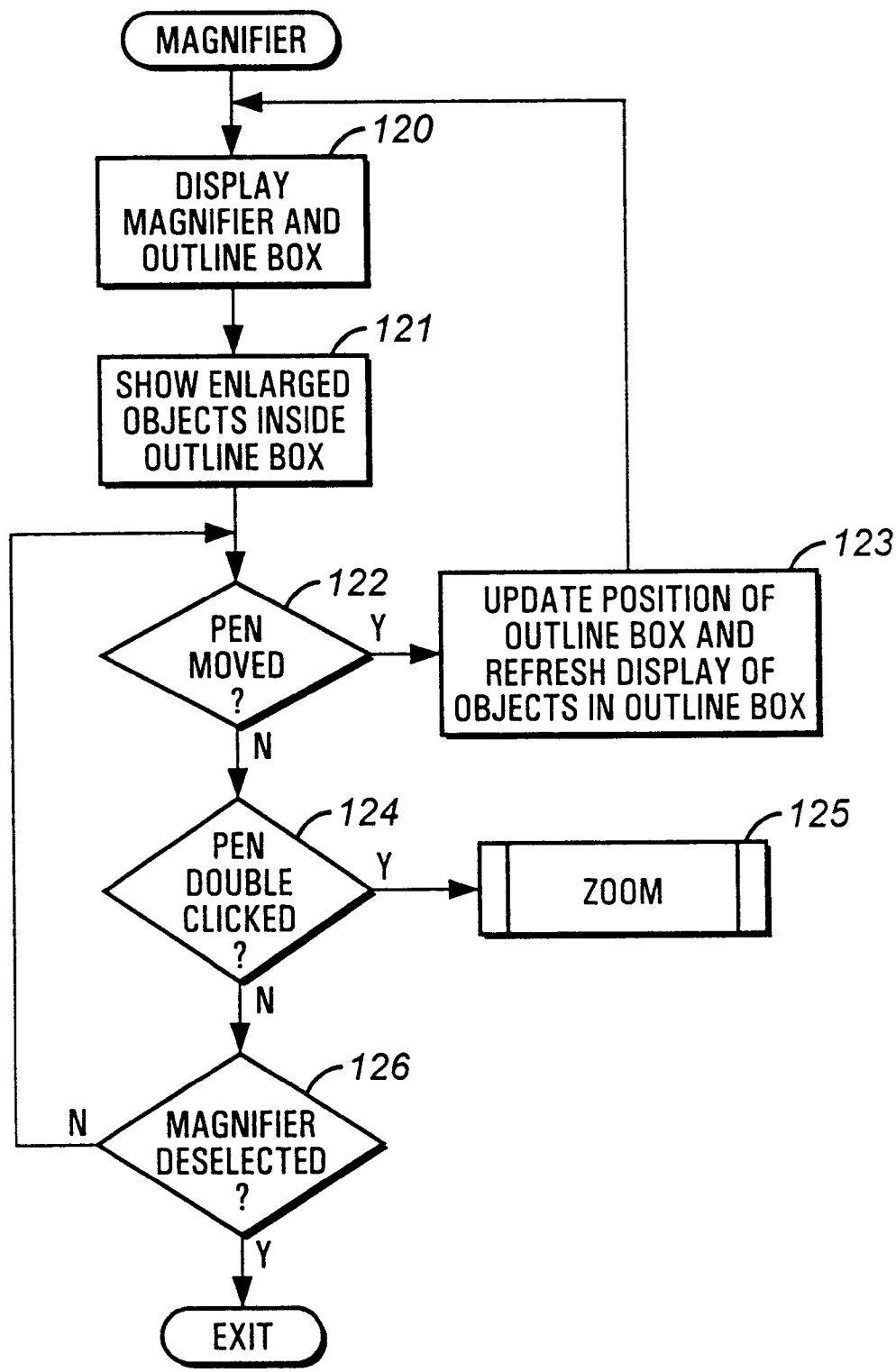
FIG. 3 is a flowchart illustrating the operation of the magnifier supporting FIG. 2.

Referring now to FIG. 3, the operation of the magnifier 108 of FIG. 2 is disclosed. Upon beginning the process in step 120 of FIG. 2, the routine displays a magnifier icon whenever the pen touches the LCD screen 26 of the computer system (FIG. 1). Further, in step 120, the routine displays an outline box around the magnifier icon to indicate the viewing area available when the magnifier zooms-in. In step 121, the routine displays an enlarged view of the drawing at the point where the pen 25 touches the screen 26 of the computer system. much like a conventional magnifier would.

Next, in step 122, the routine detects whether the pen 25 has moved. If so. in step 123, the routine updates the position of the outline box and refreshes the object shown in the display 26 before the routine loops back to step 120. Alternatively, from step 122, if the pen 25 had not moved, the routine tests in step 124 whether the user has double-clicked the pen, as detected by the digitizer 25. If so, the routine calls a zoom routine, shown in detail in FIG. 4, in step 125. From step 124, if the user has not double-licked the pen, the routine checks if the magnifier has been deselected in step 126. If not, the routine loops back to step 122 to continue the pen event checking process. Alternatively, if the magnifier has been deselected in step 126, the routine exits FIG. 3.

Figure 4:
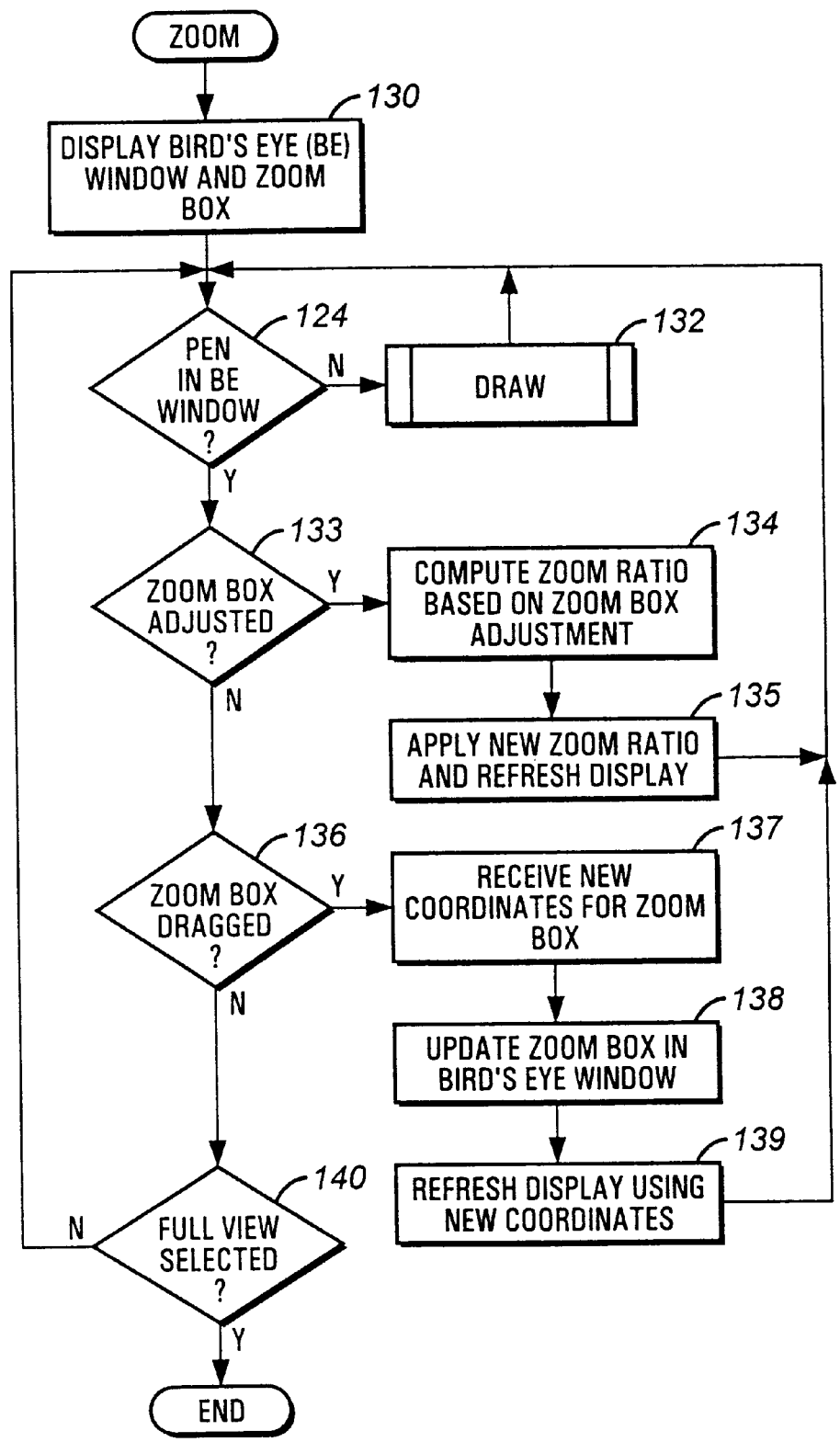
FIG. 4 is a flowchart illustrating in more detail the zoom process of FIG. 3.

Referring now to FIG. 4, the routine to provide the zoom function is disclosed in more detail. In step 130 of FIG. 4, the routine displays a Bird's Eye (BE) view of the entire drawing in a BE window. Further, a zoom box is displayed inside the BE window to indicate to the user his or her relative position on the drawing. The zoom box has four sides which are selectable by the pen to adjust the zoom scale, as discussed below. Next, in step 131. the routine checks for a pen event occurring within the BE window of step 130. If not, the pen event belongs to the primary window and representing either a draw or edit event. Thus, if the pen is not in the BE window in step 131, the routine calls a draw routine in step 132 before the routine loops back to step 131. The draw routine is disclosed in more detail in FIG. 5. Alternatively, an edit event (FIG. 6) may be called.

From step 131, in the event that the pen is in the BE window, the routine transitions from step 131 to step 133 where it checks for adjustments to the zoom box to change the scaling factor of the main display window. In the event that the zoom box has been adjusted in step 133 by clicking on the zoom box and adjusting either the horizontal lengths or the vertical lengths, the routine transitions to step 134 where it computes the zoom ratio based on the zoom box adjustment. Preferably, the zoom ratio is computed as a function of the ratio of the length of the zoom box to the length of the BE window and further as a function of the ratio of the width of the zoom box to the width of the BE window. From step 134, the routine transitions to step 135 where it applies the newly computed zoom ratio and refreshes the main display by performing the appropriate enlargement or shrinkage on the objects encompassed within the newly adjusted zoom box. From step 135, the routine loops back to step 131 to detect the next pen event.

From step 133, if the zoom box has not been adjusted, the routine checks if the zoom box has been dragged to a new viewing location in step 133. If so the routine receives the new coordinates of the zoom box relative to the BE window in step 137. Next, in step 138, the routine updates the content and location of the zoom box in the BE window. From step 138, the routine refreshes the main display window by displaying objects located at the new coordinates of the zoom box in step 139. Next, the routine returns to step 131 to process the next pen event.

If the zoom box has not been dragged in step 136, the routine proceeds to step 140 where it checks if the user has selected the full view option. In step 140, if the user has not selected the full-view option in step 140, the routine returns to step 131 to process the next pen event. Alternatively, if the full view option has been selected, the system exits the zoom mode of FIG. 4.

Figure 5:
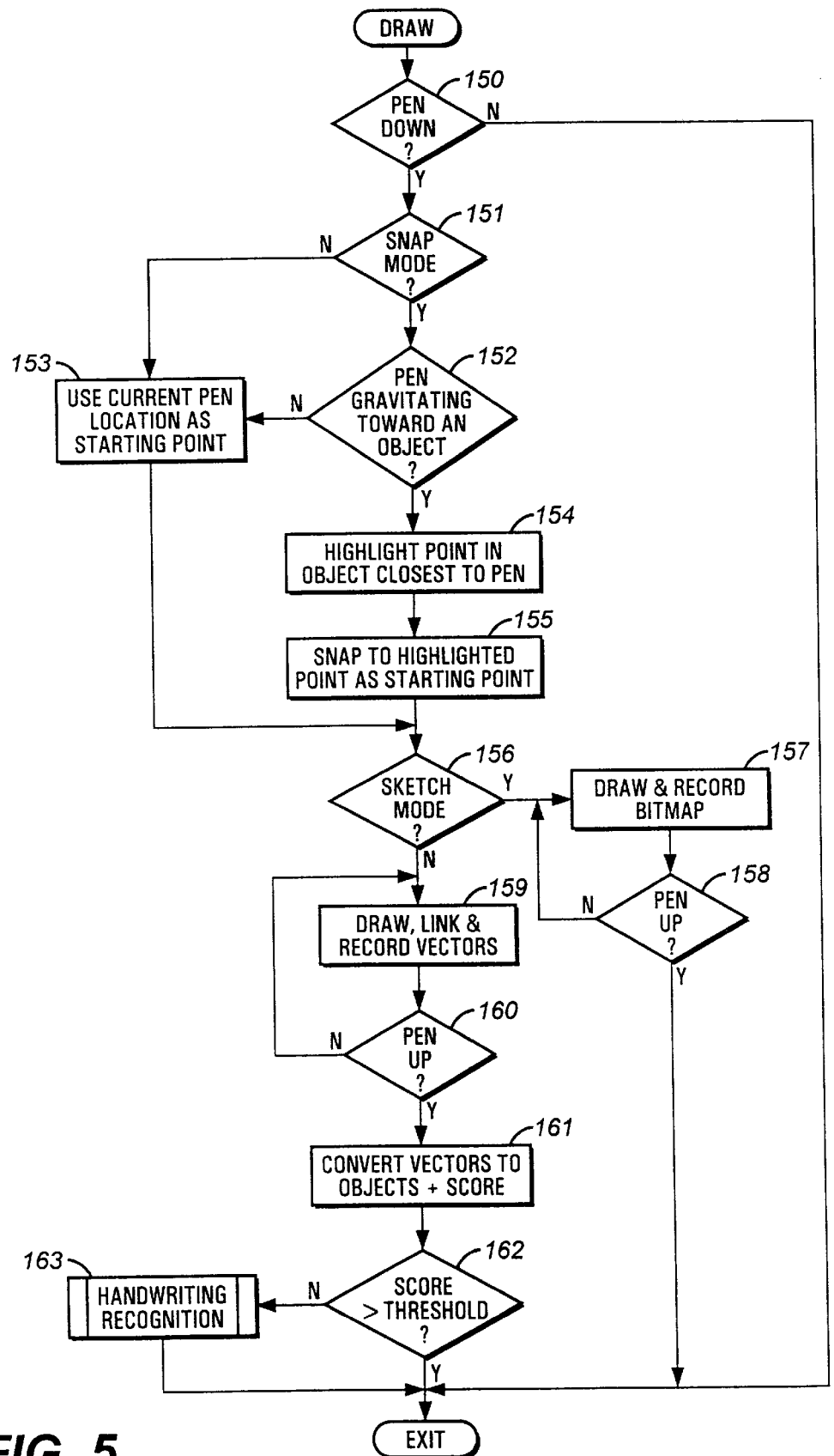
FIG. 5 is a flowchart illustrating the draw process of FIG. 4.

Turning now to FIG. 5, the routine to perform the drawing process is illustrated. The drawing process is the default process, in the absence of a user command specifying that the user wishes to enter text by hand-writing. Thus, the routine of FIG. 5 will compare the sketches against a library containing definitions and symbols for predetermined objects if the user does not specify in advance that he or she is writing text, in such case the handwriting recognition engine is to be applied. The library is located in the ROM 21 and the RAM 22 and is essentially a database optimized for quickly searching graphical objects. In FIG. 5, the invention applies an object recognizer which compares objects stored in the library to the sketches. If a match occurs and points to a best-fitting object, then the object recognizer identifies the best-fitting object as the equivalent substitution of the sketches. The object recognizer also keeps a score of the closeness between the best-fitting object and the sketches. If the score falls below a predetermined threshold, the object recognizer turns control to the handwriting recognition engine if the score improves. The recognizer with the best score in classifying the sketches is declared the winner and the output of the recognizer is selected.

Turning now to FIG. 5, step 150 of FIG. 5 checks if the user has placed the pen down on the surface of the display 26. If not, there is nothing to draw and the routine exits in step 150. Alternatively, if the pen is down in step 150, the routine checks if the snap mode has previously been enabled. If not, the routine simply uses the current pen position is the starting point in step 153 before it proceeds to step 156. Alternatively, if the snap mode has been selected, the routine proceeds to step 152 from step 151. In step 152, the routine checks if the starting pen location is near an object such that the "gravitational pull" of the object would have attracted and captured the beginning point of the new line or object. The gravitational pull is preferably defined as the pulling strength based on a centroidal average of the distance and size of a number of objects within a predetermined range of the current pen position. If no gravitational pull exists, the routine transfers from step 152 to step 153 where the current pen location is used as the starting point before moving to step 156. Alternatively, if a nearby object exerts sufficient gravitational pull to capture the starting point of the new line or object. the routine proceeds from step 152 to step 154 where the point in the object closest to the current pen position is highlighted. Next, the routine snaps to the highlighted point as the starting point in step 155.

From step 153 or 155, the routine next determines whether the drawing is to be saved as a hand-drawn bitmap sketch or as a converted series of vectors and/or predefined objects in step 156. If the sketch mode is selected, the routine transfers from step 156 to step 157 where the hand sketch drawing is recorded as a bitmap. In this mode, as long as the pen is down and moving, the bitmaps generated by the pen movement is saved. Thus, in step 158, the pen status is checked. If the pen is down in step 158, the routine loops back to step 157 to continue to record the pen movement. Alternatively, if the pen comes up in step 158, the routine exits.

Alternatively, if the sketch is to be converted into a series of vectors best matching one or more objects, the routine proceeds to step 159 from step 156 where the drawn vectors are recorded and linked. As long as the pen is down in step 160, the routine loops back to step 159 to continue processing the sketch. Once the pen is up in step 160, the routine transfers to step 161 where the vectors are converted into the best matching objects by matching the hand strokes and the size to predict the closest drawing objects.

The conversion process of step 161 is known by those skilled in the art and is similar to the way the GRAFFITI engine recognizes the alphabets. The vector conversion can be a computationally simple comparison of various attributes, including a pen stroke, a pen speed, and a pen vector, among others. Additionally, in the event that certain object(s) is/are statistically unlikely to appear as a neighbor of certain other object(s), a grammar structure can be used to improve the recognition process. Further, to reduce confusion among objects each object may be requested to be drawn using particular strokes, such as those strokes in GRAFFITI. Alternatively, as discussed in the above incorporated by reference U.S. application Ser. No. 08/461,646, the user's handwriting or sketch strokes may be compared with object models stored in a dictionary using a template matcher, a fuzzy logic matcher, a neural network, a dynamic programming system, a hidden Markov model (HMM), or combinations thereof to arrive at the proper classification of the objects. The routine of step 161 also computes a closeness score which is a prediction of the accuracy of the classification of the object. The score is preferably computed as a square of the differences between the sketched object and the classified object.

Next, in step 162, the routine checks if the score is less than a predetermined threshold. indicating that the system is not certain of its classification decision. If the score obtained in step 163 is lower than a predetermined threshold, the routine transfers the recognition process to the handwriting recognizer such as GRAFFITI discussed above. Upon completing the recognition process from step 158 or 163, the routine exits the draw process of FIG. 5.

Figure 6:
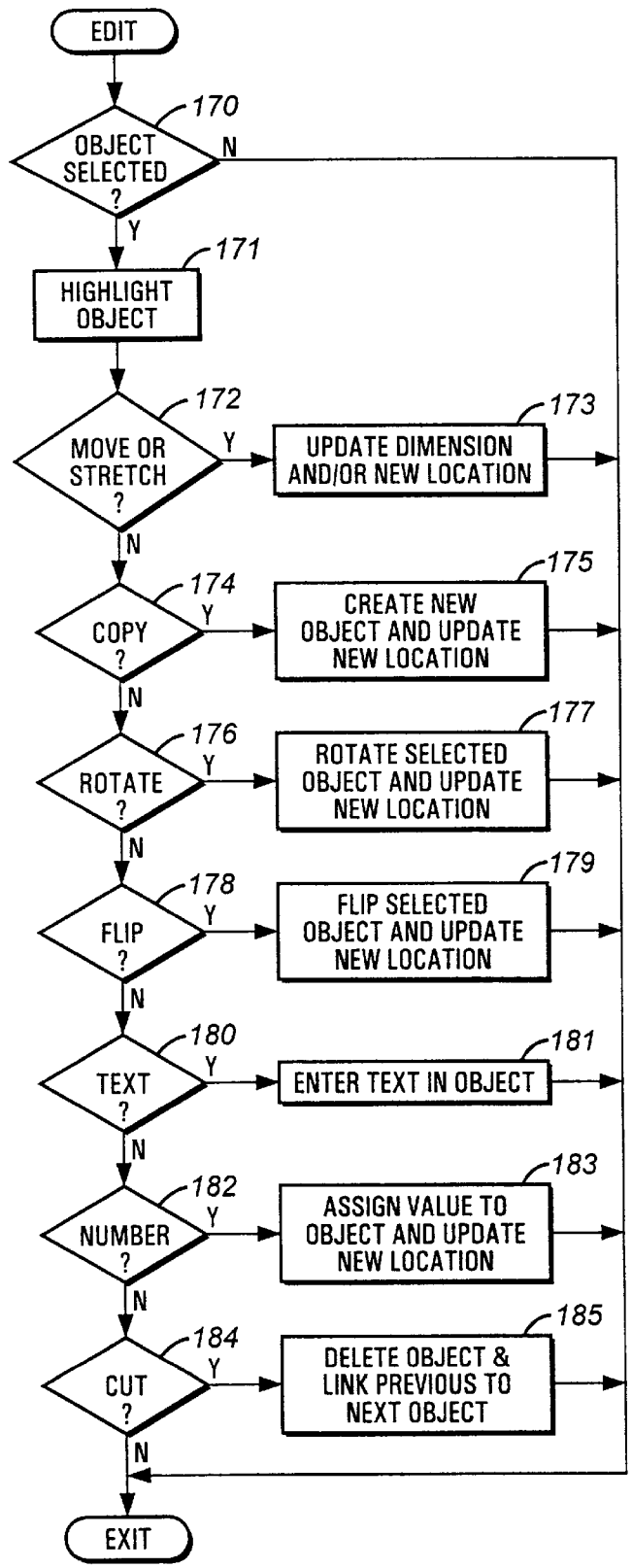
FIG. 6 is a flowchart illustrating the process for editing drawings generated by the draw process of FIG. 4.

Referring now to FIG. 6, the routine to edit the drawn objects is disclosed in more detail. In FIG. 6, the routine checks if one or more objects have been selected in step 170. If not, the routine simply exits. Alternatively, if at least one object has been selected in step 170, the routine highlights the object(s) in step 171. Next, in step 172, the routine determines if the object has been moved or stretched in step 172. If so, the routine updates the dimensions and key points of the object, as well as the new location of the object in step 173. After completing step 173, the routine deselects the object(s) and exits the edit routine of FIG. 6.

If the object has not been moved or stretched in step 172, the routine tests if the selected object(s) is/are to be copied in step 174. If so, the routine creates new object(s) based on the selected object(s) and links these new objects to existing objects before exiting the routine of FIG. 6. Alternatively, if the user does not want to copy objects, the routine checks if the user wishes to rotate the selected object(s). If the objects are to the rotated, the routine complies with the request in step 177 where the selected object(s) are rotated and their new positions are noted in the linked list data structure. Afterward, the routine deselects the object(s) and exits.

From step 176, if the objects are not to be rotated, the routine checks if the user wishes to flip the objects. If so, the routine flips them in step 179 and updates the location of the selected objects therein before exiting the routine of FIG. 6. Alternatively, from step 178. the user may wish to enter text associated with the selected objects in step 180. If so, the routine allows the user to enter text and to associate the text with the selected objects in step 183 by adding the text to the linked list data structure for the objects. The text entered in step 183 may include numbers as literals. After step 183, the routine deselects the object(s) and exits.

Alternatively, from step 180, the routine checks if the user has assigned a number such as the length or width of the selected object(s). If so, the routine proceeds with step 183. The number(s) entered in step 183 is/are dimensional assignments which differ from the literal number entered in the text data entry step 181. In step 183, the number entered is stored as part of the dimensions of the object(s) and the size of the object(s) is/are changed in the same manner as that of step 173. From step 183, the routine deselects the object(s) and exits.

From step 182, if numbers are not entered, the routine checks if the user wishes to cut the selected object(s) in step 184. If so, the respective object(s) are deleted and the link associated with the element immediately prior to the first selected object is linked to the element immediately after the last selected object in step 185. Further, the data structure associated with the deleted objects are cleaned-up such that the memory allocated to the deleted objects is released back for other uses. From steps 184 or 185, the routine of FIG. 6 deselects the object(s) and exits.

Although not shown, the present invention contemplates that the original data structure prior to the edit operation is temporarily archived in memory to enable the operation of the "Undo" option under the "Edit" menu shown in FIG. 2. The "Undo" option is useful in the event that the user wishes to change his or her mind after seeing the edited object(s). Further, the present invention recognizes that voice recognition is useful for certain data entry aspects such as the entering of text annotation and the selection of components. Thus, the present invention contemplates that voice recognition as disclosed in pending U.S. application Ser. No. 08/461,646 can be used in place of the pen to select/deselect objects and to perform changes to the objects.

Figure 7:
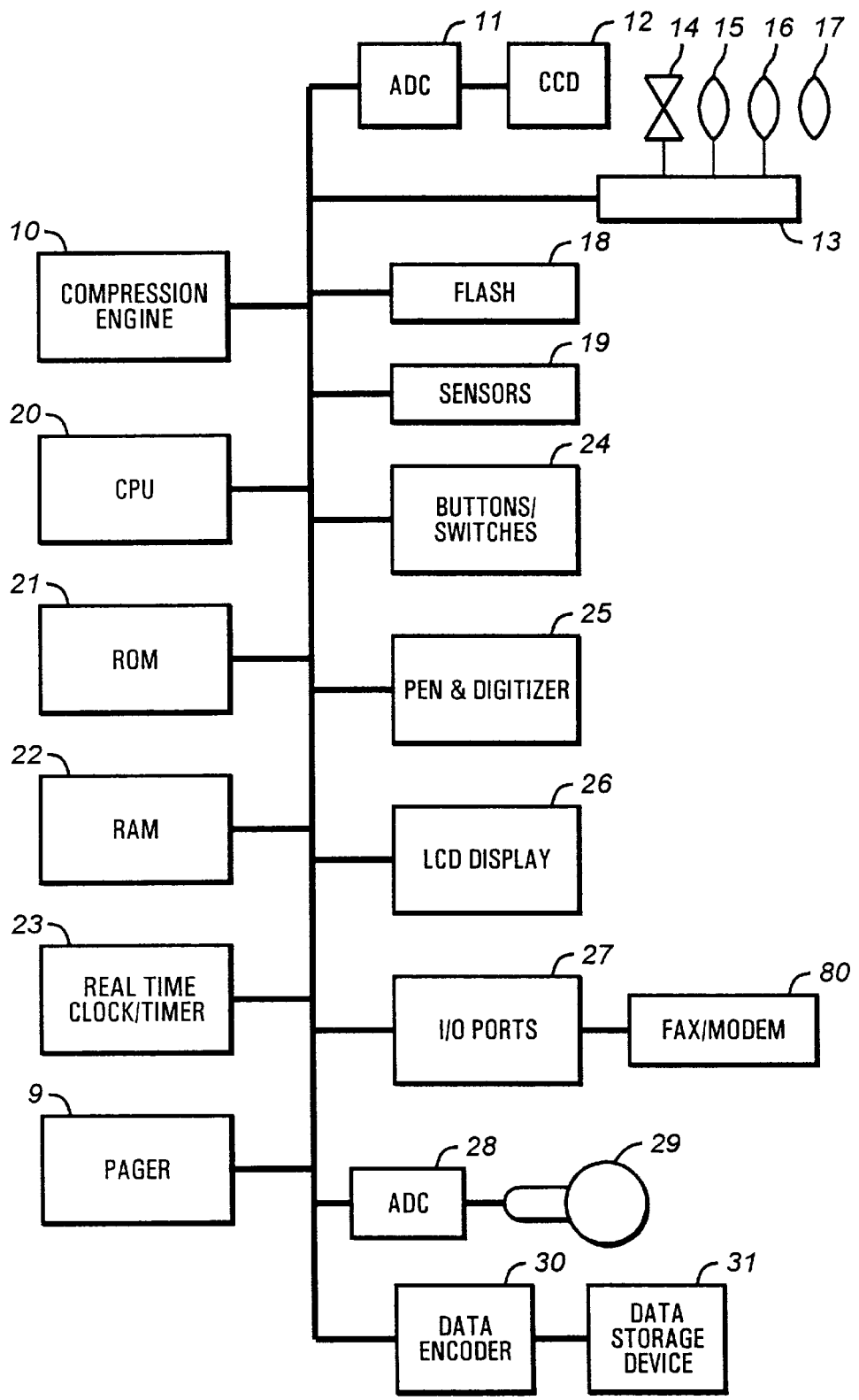
FIG. 7 is a diagram showing a digital camera with text and graphical annotation capability in accordance with the present invention.

Turning now to FIG. 7, a digital camera having the annotation and sketching capability discussed above is illustrated. In FIG. 7, a number of elements bear identically labeled numbers as that of the elements of FIG. 1. As these elements are already described in FIG. 1, they need not be discussed further. In addition to the basic processing electronics of FIG. 1, the camera of FIG. 7 has a number of additional elements discussed below for supporting the photographic annotation process. In FIG. 7, a JPEG or MPEG compression engine 10 is connected to the CPU 20 to offload the data compression process from the CPU 20 before providing the compressed data to a data encoder 30 for subsequent saving to a data storage device 31. The compression engine 10 can utilize the wavelet technique and other techniques known to reduce data size. Further, if the processor 20 is sufficiently powerful, the CPU 20 can perform the compression function via a suitable compression software stored in the ROM 21 or the RAM 22.

The data encoder 30 encodes regular or compressed data into a suitable format and records the encoded data on the storage device 31. The data encoder 30 may comprise a formatting circuit operating in conjunction with a magnetic head adapted to store data on either a magnetic data storage device 31 such as a floppy disk, among others, or an optical head adapted to optically encode data on an optical data storage device 31 such as a floptical disk. Alternative, the encoder 30 and the data storage device 31 may be of a magneto-resistive data storage device.

Turning now to the components needed for the photographic process elements 11–19 are shown in FIG. 7. These elements are conventional and known to those skilled in the photographic art. In FIG. 7, an analog to digital converter (ADC) 11 is connected to the CPU 20 in FIG. 7. The ADC 11 receives and digitally converts the analog video information from a charge coupled device (CCD) 12 which captures images associated with the pictures. The CPU 20 is also connected to actuators 13 which physically controls a number of camera settings. The actuators 13 are connected to a shutter speed control unit 14 which opens and closes for a predetermined time and a lens opening control unit 15 for adjusting light levels to be received by the CCD 12. Further, a lens focusing unit 16 is provided to automatically focus the images, based on information provided by one of the sensors 19. The CPU 20 reads data from the distance sensing portion of the sensors 19 and instructs the actuator 13 to adjust the lens focusing unit 16 until a photographic lens 17 reaches a position corresponding to the object distance data to perform the auto-focusing operation. As is known, the lens 17 is provided to capture and direct light associated with the images to the units 14–16. Further, the lens 17 may be automatically switched with additional lens to provide zoom or panoramic view. Additionally, the lens 17 have one or optional filters to filter lights coming to the lens 17. Also, a flash unit 18 and sensors 19 are connected to the CPU 20 to sense and provide corrective actions during the snapping of the picture. In the event that the light sensor of sensors 19 detects a low light level, the sensors 19 inform the CPU 20 to take corrective actions, including changing the settings of the shutter speed control unit 14 and the lens opening control unit 15. Additionally, the flash unit 18 may be actuated, depending on the availability of light, to provide additional lighting. Although not strictly a part of the photographic process, the camera of FIG. 7 has the fax/modem 80 attached for transmitting a high resolution package representative of the annotated image captured by the CCD 12. The fax/modem 80 can be attached to a conventional land-line or can be wireless to provide instant imaging capability.

Figure 8:
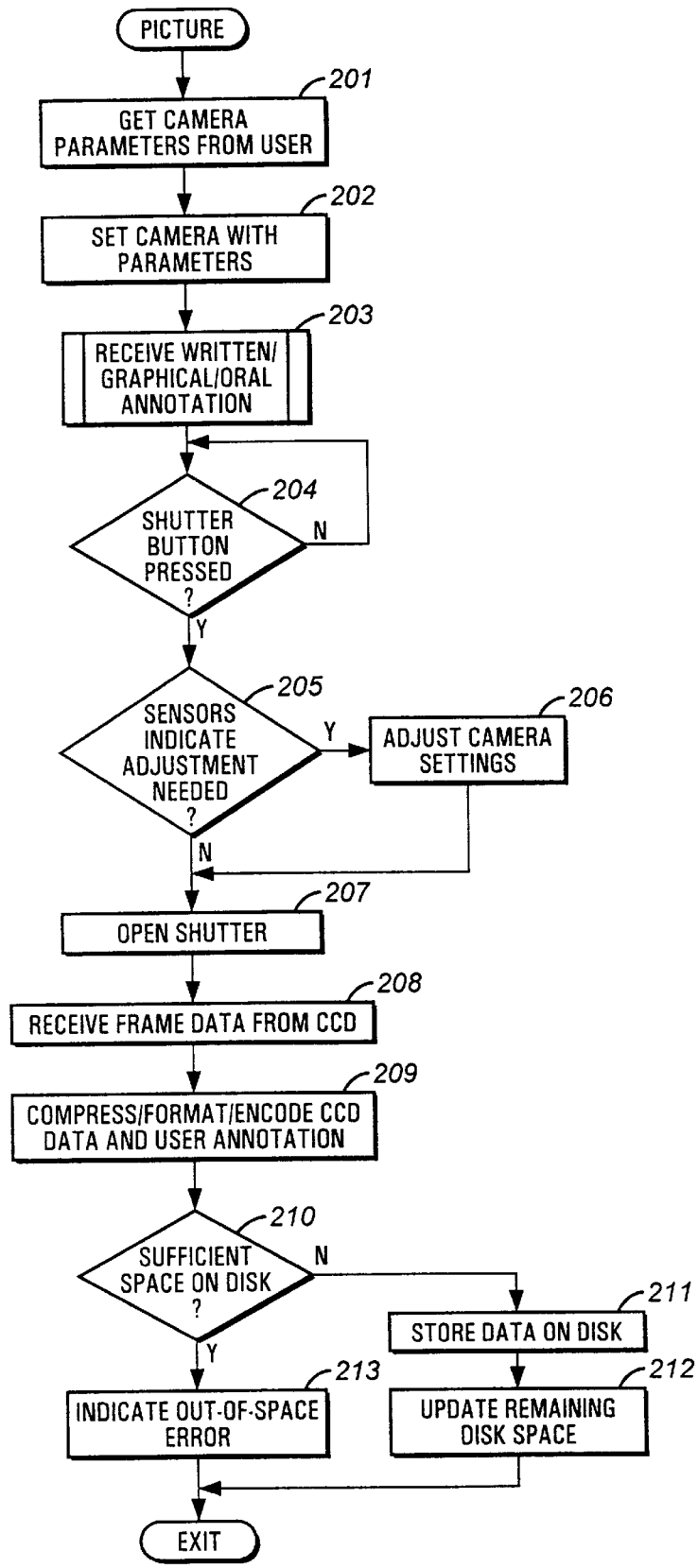
FIG. 8 is flowchart illustrating the process for operating the camera of FIG. 7.

Referring now to FIG. 8, the routine to take a picture using the camera of FIG. 7 is shown. In FIG. 8, the routine first obtains camera parameters from the photographer in step 201. These parameters include the zoom adjustment setting which causes the actuators 13 to adjust its photographic instruments. Next, the routine proceeds to set instruments on-board the camera of FIG. 7 with the user entered parameters in step 202. In step 203, the routine receives written, graphics or oral annotations from the photographer, as discussed in more detail in FIG. 13. The present invention thus contemplates that the voice recognizer as disclosed in pending U.S. application Ser. No. 08/461,646 is interchangeable and equivalent to the pen and the keyboard. Thus the camera of FIG. 7 can use as inputs the microphone, the pen or the keyboard.

From step 203, the routine checks if the shutter button 24 has been depressed. If not, the routine waits for such event. Alternatively, once the shutter button 24 has been depressed, the routine checks if the sensors 19 indicate that camera settings need adjustments and/or the flash needs to be activated. If so, the routine adjusts the camera settings and power up the flash unit 18 if necessary in step 206.

From step 205 or step 206, the routine then opens the camera shutter in step 207 and a frame data is captured by the CCD 12 of FIG. 7. The output of the CCD 12 is digitized by the ADC 11 before it is processed by the CPU 20 and compressed by the compression engine 10 in step 209. Additionally, the routine provides the compressed data to the data encoder 30 which encodes the CCD data as well as the annotations received in step 203. Next, the encoder 30 checks for available space on the data storage device 31 in step 210. If sufficient space exists, the routine stores data on the disk or data storage device 31. From step 211, the routine updates the data structure on the disk, including the File Allocation Table (FAT) structure, to indicate the new file and to update the remaining disk space calculation in step 212 before the routine exits. From step 213, in the event that insufficient space exists, the routine indicates an out-of-space error to the user via the LCD display 26 in step 213 before the routine exits. At this stage, the photographer can cancel the picture just snapped, or can insert a new data storage device 31 to continue the picture taking process.

Figure 9:
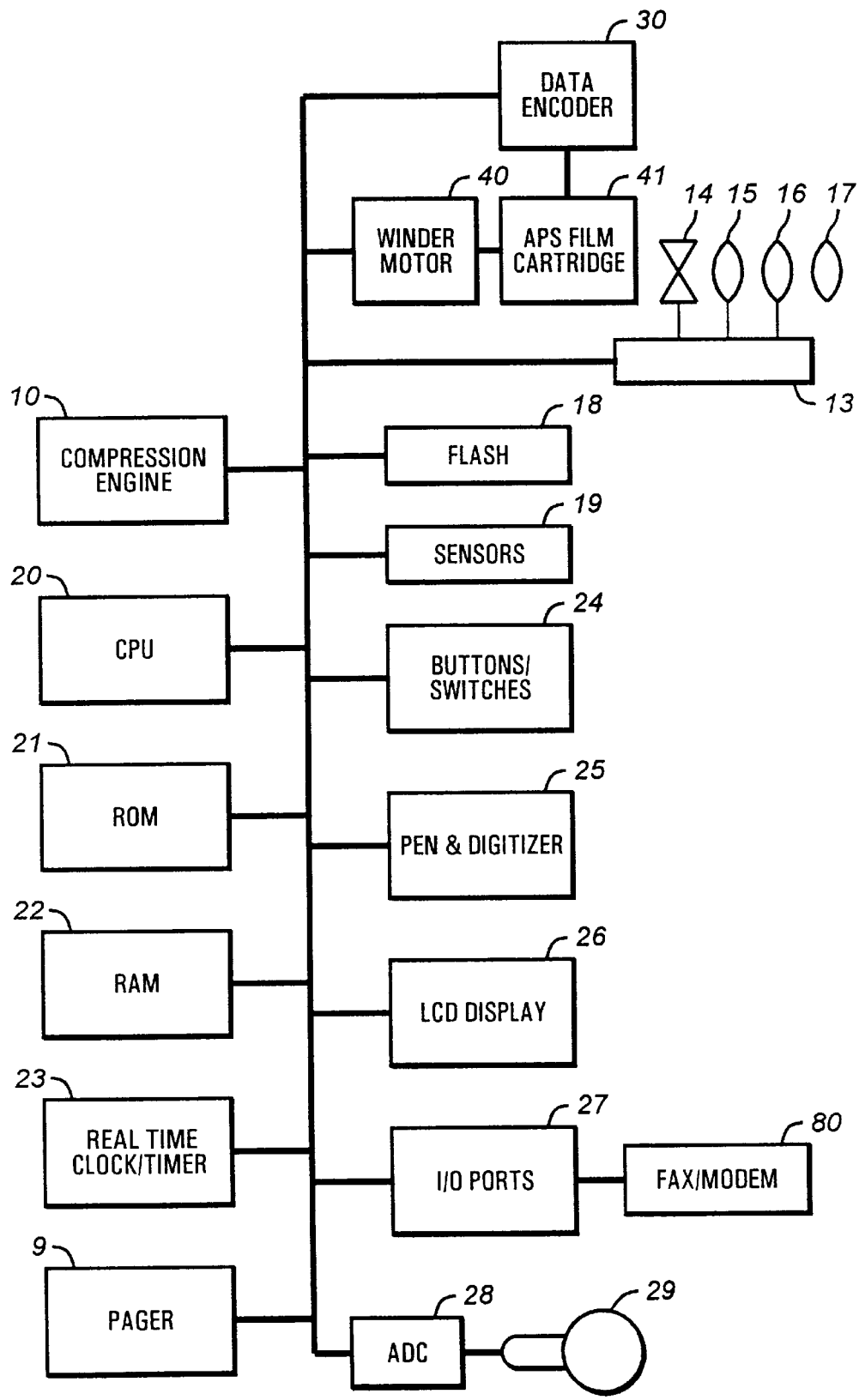
FIG. 9 is a diagram showing an APS camera embodiment of FIG. 7.

Turning now to FIG. 9, a second camera embodiment is shown. The embodiment of FIG. 9 operates in conjunction with films that have a conventional silver halide layer on the front side to accept light as is known in the art. In addition, these films have a magnetic backing on the back side that can be magnetically written to using a magnetic head. These films are collectively called Advanced Photo System (APS) compatible films, and include the AVANTIX products from Kodak Corporation. APS offers a new film system whose back side is partially or fully coated with a thin layer of magnetic particles. The initial APS uses only the top and bottom edges on the film for magnetic recording, which although limited in capacity, still allow the recording of digital data, including print formats, lighting conditions, subject distance, time and date exposure, onto the magnetic layer. Additionally, the entire back surface of the film could be magnetically coated to provide about two kilobytes of storage capacity which is sufficient to record compressed voice as well as coarse digital images on the magnetic back surface using a magnetic recording head that does not scratch the surface of the film. Such digital data is communicated automatically to photographic finishers with APS compatible equipment. The photographic finishers utilize the data to improve print quality and add the customized, personalized touch to each print.

The APS compatible embodiment is shown in FIG. 9. In addition to basic camera components shown in FIG. 7, the embodiment of FIG. 9 has a receptacle to receive the APS film cartridge 41. Further, a winder motor 40 allows the film 41 to be automatically advanced for the next shot or rewind when film usage is completed. The winder portion 40 of the camera is basically a spool drive consisting of a spool portion and a sprocket portion well known in the art. Additionally, a magnetic data encoder 32 is connected to the APS film cartridge 41 to encode information onto the magnetic backing of the APS film 41. As is known in the art, the magnetic data encoder 32 has a magnetic head which magnetically records or reproduces data in the magnetic information recording portion when the film is transported by the winder 40. The magnetic head is arranged on a back cover of the camera or a supporting member of a film pressure plate (not illustrated) and correctly maintained in a specified position by closing the back cover of the camera of FIG. 9.

Preferably, the magnetic head of the data encoder 32 is a flat-type magnetic head whose core shape is made to be longer in the lengthwise direction such that the thickness of the winding coil is reduced so that a thinner magnetic head can be achieved with the same magnetomotive force of thicker coils. The magnetic head magnetically records or reproduces data with a front core part forming a gap portion for magnetically recording and reproducing data is connected to a back core part wound by a coil in which signal currents for magnetic recording or reproducing can flow. The information is written on the film magnetic recording portion through the magnetic head of the encoder 32. When the transportation and writing of the information are completed, a solenoid/roller disengagement operation is conducted where the APS media is released from the suction solenoids or rotary rollers and the solenoids or rollers are moved to a recess in the camera. In this manner, each frame of the APS film is exposed and annotated data is recorded onto the magnetic portion of the APS media.

When the APS film has reached the end of the film, the camera determines whether an unexposed frame of the APS film exists on the basis of the specified maximum number of frames. If unexposed frames exists, the camera rewinds the APS film to the location of the unexposed frame(s) and allow the photographer to use the unexposed frame(s). Once all frames have been exposed, the winder 40 rewinds the film until the continuous output from the media photoreflector has been deasserted, indicating that the leader portion of the film has passed. Thus, the rewinding of the film is completed so that only the leader portion of the film is outside of the cartridge.

Because the solenoids or rollers are safely moved to a retreat location after the recording process, the magnetic head is not continually pressed against the film. Further, the risk of media base warpage which is produced by pressing head against the media all the time is reduced. Thus, the risk of scratching the media M is reduced during the film winding process. Further, as the magnetic head is fixed in a specified place while the solenoids/rollers are advanced and retreated, the reliability of the camera is improved as the risks of breaking a wire linking the magnetic head to the processor is decreased. Additionally the fixing of the head in a specified place enables the head angle to a film traveling direction to be easily adjusted.

Figure 10:
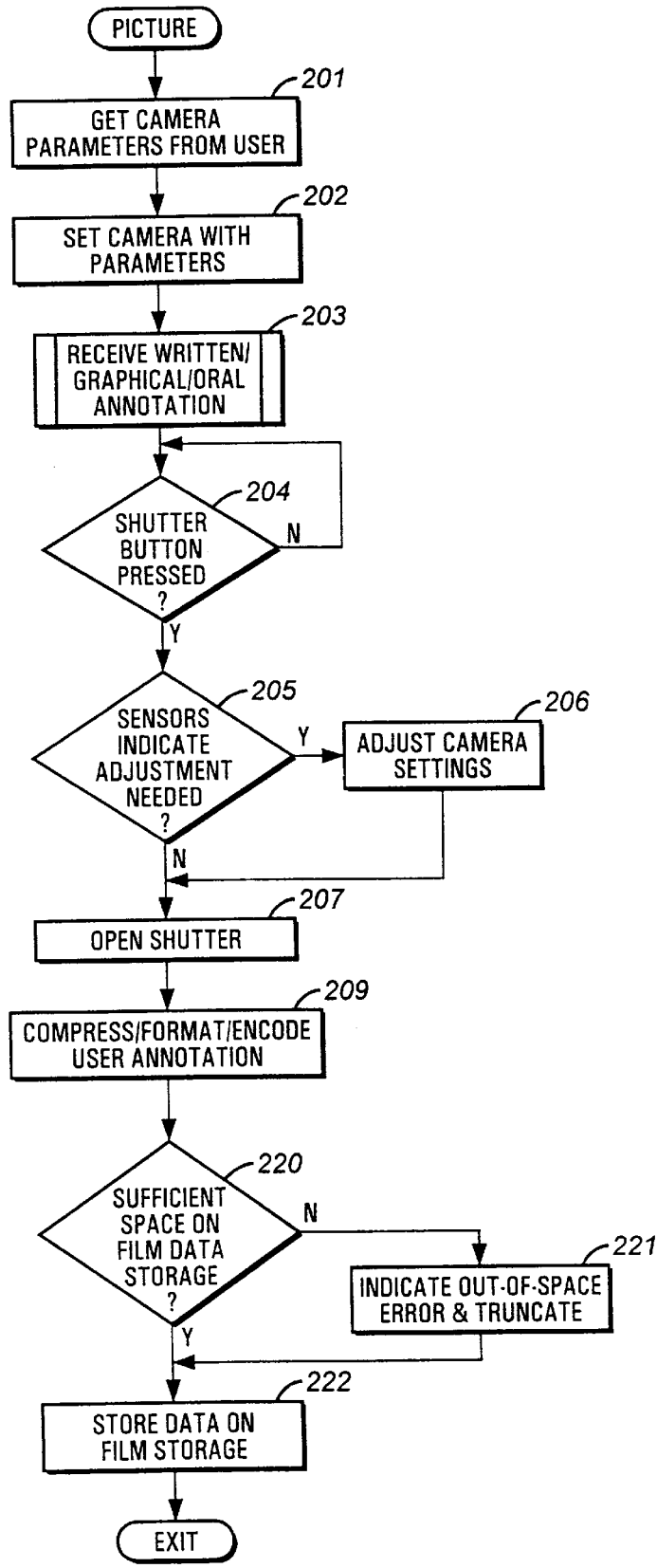
FIG. 10 is flowchart illustrating the process for operating the camera of FIG. 9.

Referring now to FIG. 10, the routine for taking a picture with the camera of FIG. 9 is discussed. The routine of FIG. 10 shares many commonly numbered elements with those of FIG. 8 and thus the description of those elements in FIG. 8 still apply to the common elements. Turning now to the new elements in FIG. 10, after compressing and formatting and encoding annotations in step 209, the routine checks for sufficient space on the magnetic data storage portion of the APS compatible film in step 220. If the insufficient space condition exists, the routine indicates an out-of-space error to the photographer in step 221 and truncates the annotation if the user does not wish to shorten his or her annotations. From step 221 or 222, the routine stores data on the magnetic data storage portion of the APS film in step 222. Thus, after the photographic film portion of the APS film has been conventionally exposed in step 207, the magnetic head of the encoder 32 engages the magnetic information recording portion of the media when the film is transported by the winder 40.

The engagement is achieved when the processor actuates suction solenoids or other suitable means such as oppositely positioned rollers (not shown) which engage and press the magnetic portion of the APS film against the magnetic head. When the pressing operation has been completed, film transportation starts using the film winder 40. Next, the magnetic recording signals are transmitted to the magnetic head and the APS-compatible film magnetically records data corresponding to the specified photographic frame. The data written to the magnetic portion of the film include annotations such as camera settings, photographic modes, photographic frame number, photographing time and annotated comments.

Figure 11:
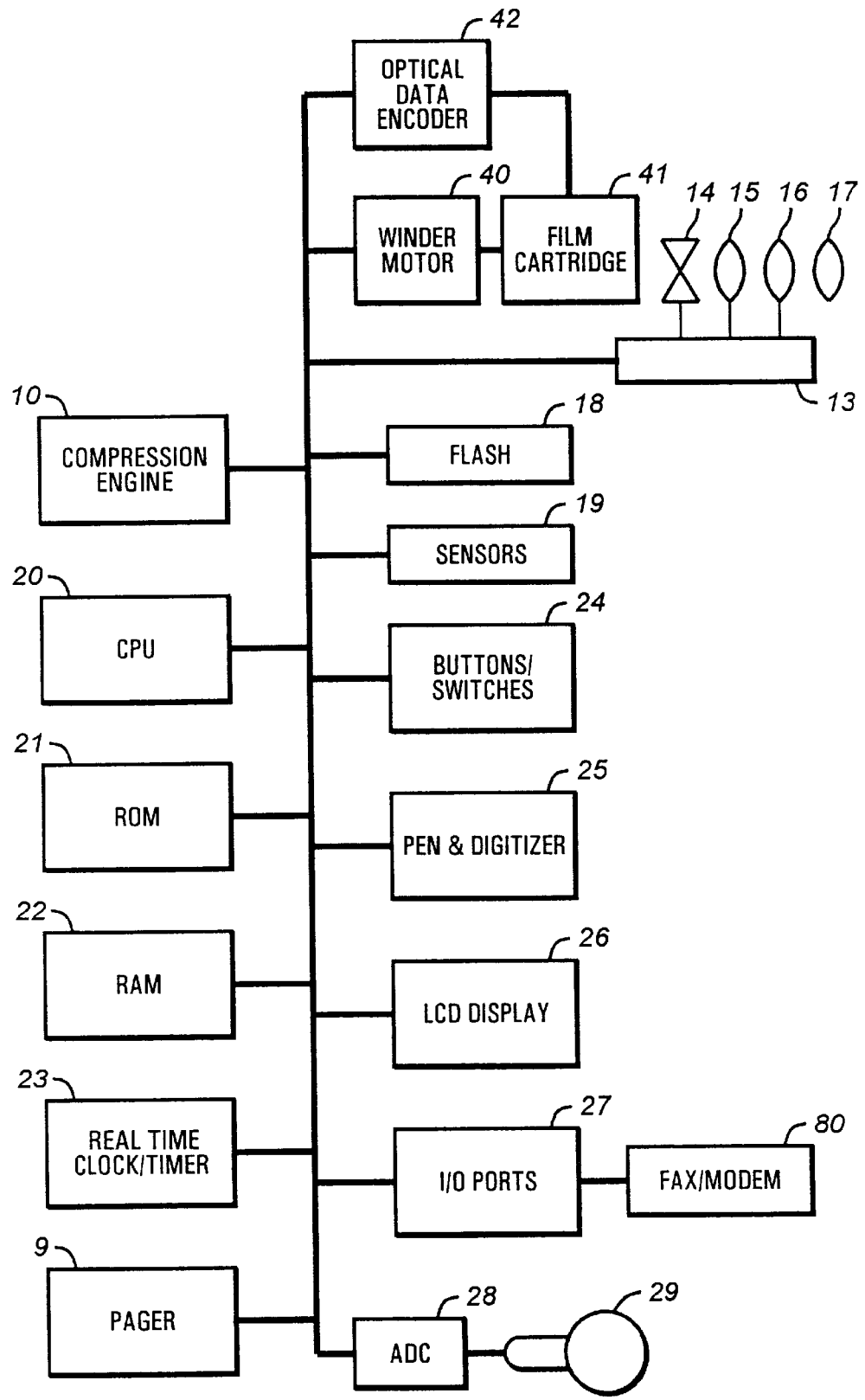
FIG. 11 is a diagram showing a conventional photographic camera embodiment of FIG. 7.

Referring now to FIG. 1, a third embodiment of the camera with annotation capability is shown. In this embodiment, a conventional silver-halide film which has been commercially available since the beginning of the film industry is adapted as a data storage element to store annotations. The embodiment of FIG. 11 has many commonly labeled elements to those of FIGS. 7 and 9 and the discussion of these elements need not be repeated. FIG. 11 further has an optical data encoder 42 which exposes the film in the film cartridge 41 to an array of light beams. The optical encoder 42 preferably generates light beams via a plurality of light emitting diodes (LEDs) mounted within the housing of the camera. The LEDs can be controlled to selectively turn on and off so as to selectively expose the silver halide film. Such selective exposure optically encodes information onto the edges of the film. or if more information is needed, onto the entire frame of film. After processing, the film has dark spots and light spots, representing ones and zeros. These ones and zeros can be detected by sensors to reconstruct the stored annotations, as is known in the art. Accordingly, the embodiment of FIG. 11 turns a frame of film into an equivalent data storage device 31 of FIG. 7.

Figure 12:
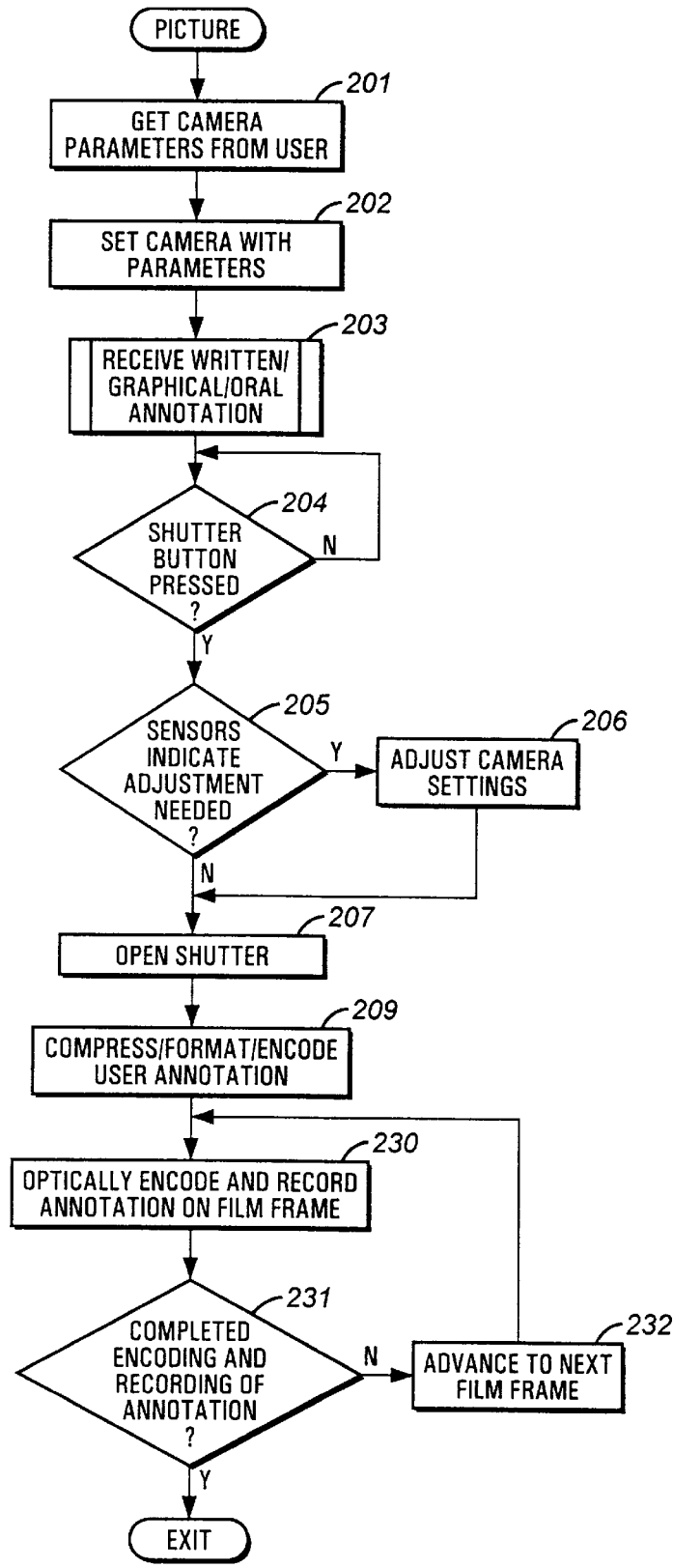
FIG. 12 is flowchart illustrating the process for operating the camera of FIG. 11.

FIG. 12 further illustrates the process of taking a picture using the camera of FIG. 11. In FIG. 12, a number of steps are commonly labeled to the steps of FIG. 8. The discussion of these steps will not be repeated. In step 209 of FIG. 12, the data is compressed via the compression engine 10 due to the limited storage capacity of the film/LED array combination. The data is further formatted in step 209. From step 209, the routine optically encodes and records the annotation on the film frame by selectively turning on and off each diode in the LED array of the optical encoder 42. In step 231, the routine determines if the annotations have been completely encoded onto the current frame of film. If data remains and the film frame has been used up, the routine advances to the next film frame in step 232 and repeats the encoding and recording on the next frame in step 230. Alternatively, from step 231, if the encoding/recording process has been completed in the current film frame, the routine of FIG. 12 exits.

Figure 13:
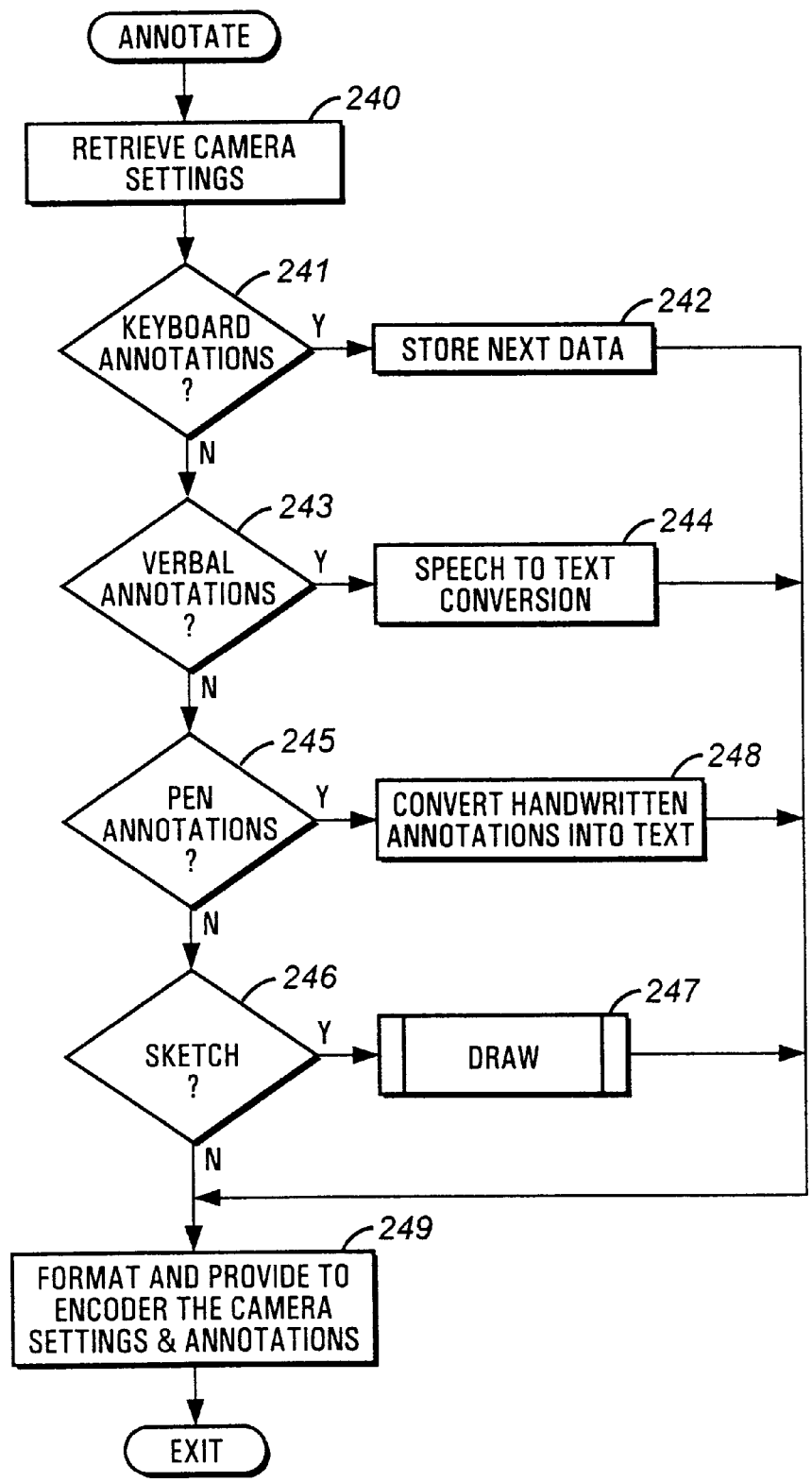
FIG. 13 is a flowchart illustrating the process for taking a picture using one of the cameras of FIGS. 7, 9 and 11.

Turning now to FIG. 13, the routine to receive annotations from the camera instruments as well as the photographer is shown. In step 240, the routine retrieves camera settings from the photographic instruments and, if the instrument settings are to be annotated on the film, the routine formats the data in preparation for encoding. Next, the routine determines if data has been entered via the keypad or buttons/switches 24. If so, the routine stores the typed text data in step 242 before it proceeds to step 249 to encode the data. Alternatively, if data has not been entered via the keypad/switches 24, the routine checks if verbal annotations have been entered in step 243. If so, the routine performs a speech to text conversion in step 244 before proceeding to step 249. The speech to text conversion may be performed in accordance with the teachings of the previously incorporated patent application Ser. No. 08/461,646, filed Jun. 5, 1995 by the present inventor.

Alternatively, from step 243, if no verbal annotations have been entered, the routine checks if pen annotations have been entered in step 245. If so, the routine proceeds to step 248 to convert the handwritten annotations into text using the hand recognition process discussed above. From step 248, the routine jumps to step 249 to format and encode the data. From step 245, if the handwritten annotations are not available, the routine checks for sketches as annotations. If the pen stroke is a part of a sketch, the routine proceeds with the draw routine of FIG. 5 in step 247. From step 242, 244, 247 or 248, the routine formats and provides the cumulated data to the data encoder to encode the camera settings and user annotations in step 249 before the routine of FIG. 13 is exited.

Figure 14:
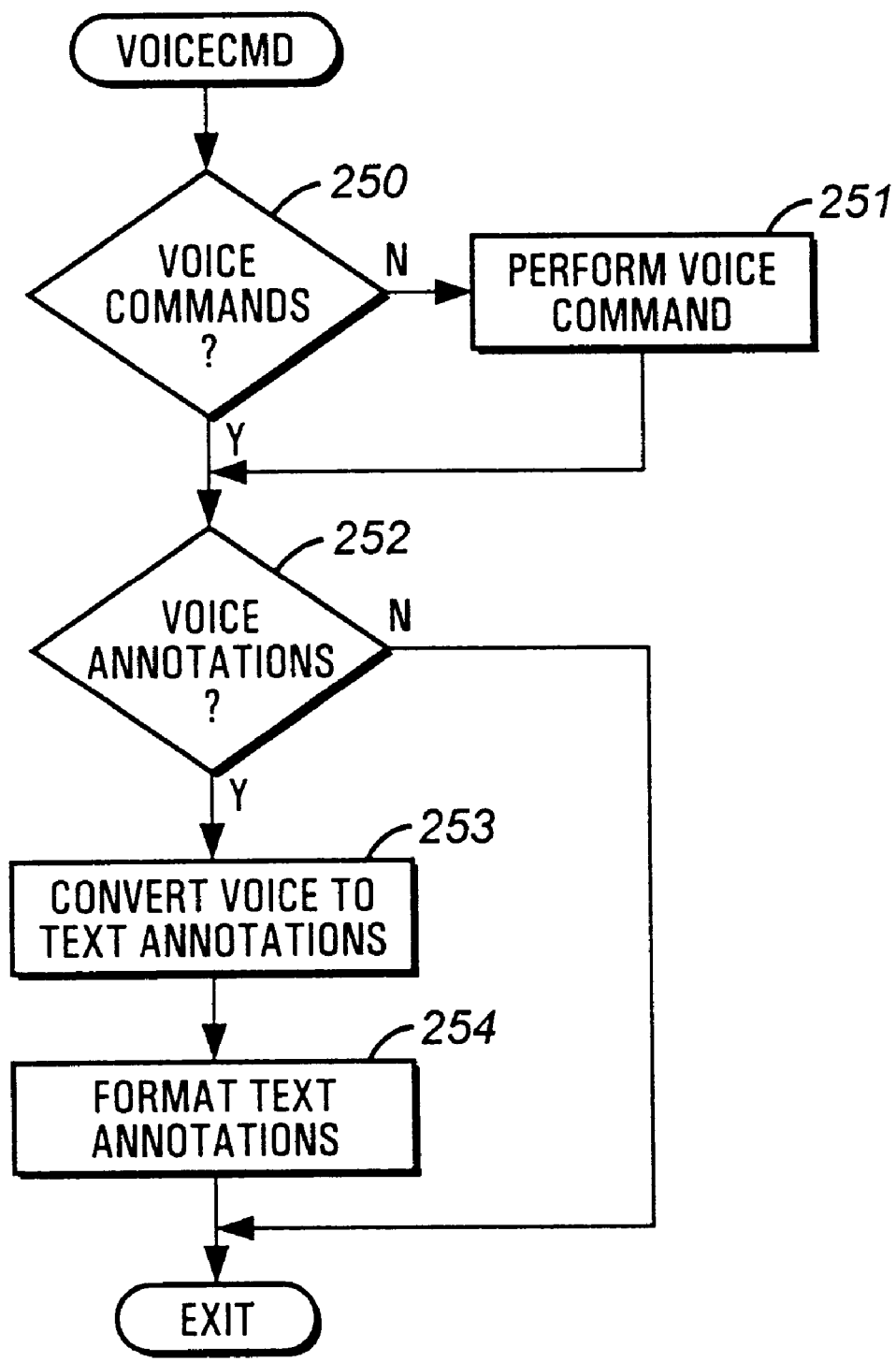
FIG. 14 is a flowchart illustrating the process for voice annotation.

Turning now to FIG. 14, the routine to process voice commands and data in step 244 of FIG. 13 is illustrated in more detail. In FIG. 14, the routine checks if the voice data is a command or an annotation. If a command, the routine performs the voice command in step 251 before it proceeds to step 252 to check on voice annotations. Alternatively, from step 250, if the voice input is not a voice command, the routine checks if the voice input is an annotation in step 252. If not, the routine simply exits. Alternatively, if the voice input is a voice annotation, the routine proceeds from step 252 to step 253 where the voice is converted into text annotations. From step 253, the routine formats the converted data in step 254 such that the encoder of the camera can write to the recording media such as the disk, the APS film, or the conventional silver-halide film. From step 254, the routine exits FIG. 14.

Figure 15:
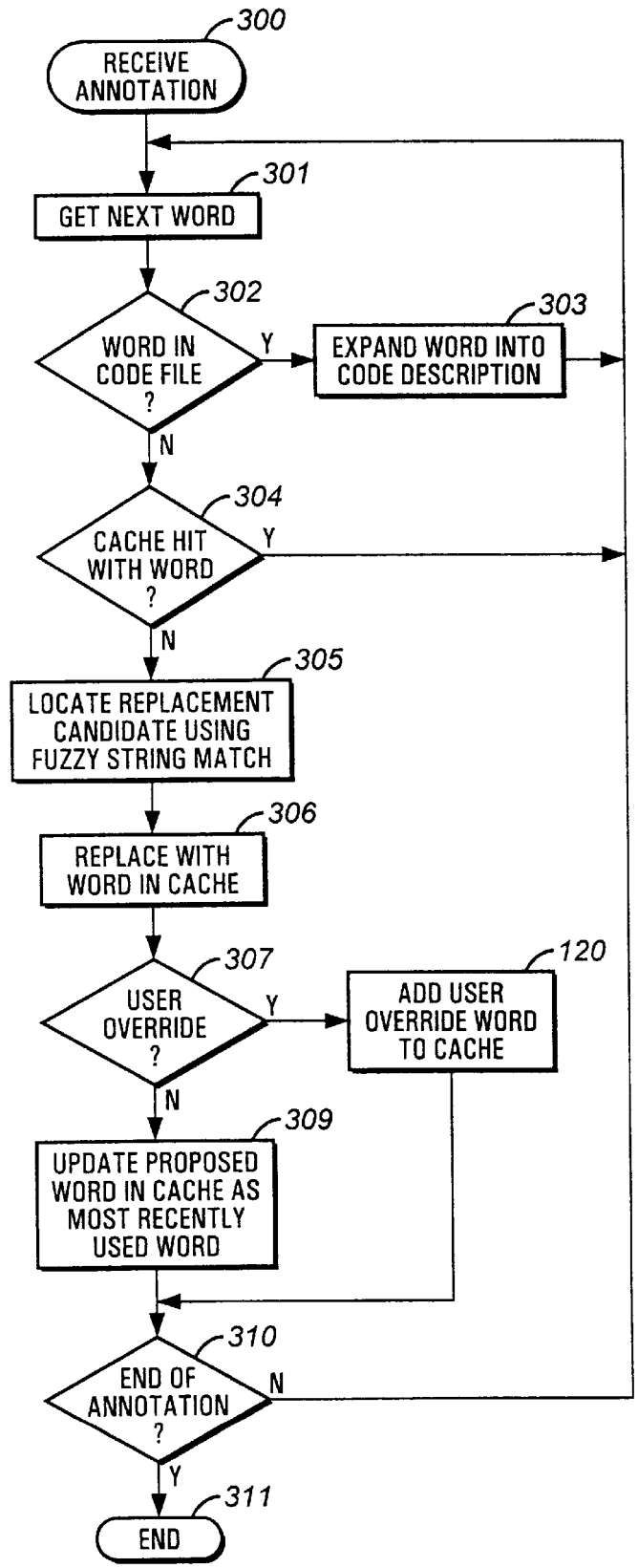
FIG. 15 is a flowchart illustrating the process for spell-checking the received text.

Referring now to FIG. 15, the routine to spell-check words entered in the annotations is shown in more detail. In FIG. 15, after the user has entered each word describing the task being worked on, the routine retrieves the word previously entered in step 301. Next, the routine checks in step 302 if the word exists in the short-hand code file or not. If the word exists in the code file, the routine retrieves the description of the code and expands the code into one or more descriptive terms in step 303. Next, as the descriptive terms are presumed to be correct, no spell-checking is performed and the routine simply loops back to step 301 to get the next word.

Alternatively, if the word does not exist in the short-hand code file in step 302. the routine performs a look-up in a cache containing the vocabulary in step 304. Preferably, the cache of step 304 maintains an active vocabulary of 1,000 words. Further, the word cache of step 304 is preferably searched using a high speed hash search which is known to those skilled in the art, although other search mechanisms such as binary search, quick search and sequential search systems can be used as well. The cache of step 304 has two components: a data component, a status component, and a link component. Preferably, the word cache is implemented as a double-ended queue which is ordered according to the most recently used word. Further, in the event that a word needs to be added to the word cache. the least recently used cell of the cache is selected and appropriately updated with the new word and its status updated as the most recently used word. The thus disclosed word cache maximally uses storage space as only the most frequently used words are stored.

From step 304, if the word generates a cache hit, the word is accepted as being correct and the routine simply updates the status of the entry in the word cache bearing the current word as the most recently word before it loops back to step 301 to check the next word. Alternatively, if step 304 results in a cache miss, the routine identifies a replacement candidate in the word cache in step 305. The replacement candidate may be identified using a number of methods known to those skilled in the art. Preferably, step 305 uses a fuzzy string matcher to detect the replacement candidate in step 305. In fuzzy string matching, the potentially misspelled word is subdivided into sets of N adjacent characters, or N-grams. The frequency with which each of the N sets of adjacent characters occurs in the word is stored in a first N-gram count array. The first word stored in the word cache is then also subdivided into N-grams. As each update is made to the second array, a corresponding update to the difference in frequencies between the two arrays. The sum of the differences in frequencies determines the holographic distance between the potentially misspelled word and the word in the cache. The process is repeated for each word in the cache. In this manner, the holographic as well as the distance metric of the potentially misspelled word is consulting in looking up the closest entry in step 305.

From step 305, the routine checks for a user-override in step 307. If the user overrides the proposed word of step 306, the routine adds the new word as the most recently used entry of the word cache in step 308 before it processes the next word in step 310. Alternatively, if the user accepts the proposed word in step 307, the routine updates the entry in the word cache corresponding to the proposed word as the most recently used word in the cache in step 309. From step 309 or step 308, the routine proceeds to step 310 where it checks if all words have been spell-checked. If not, the routine loops back to step 301 to process the next word in the description. Alternatively, if each word in the description has been checked in step 310, the routine exits in step 311.

Figure 16:
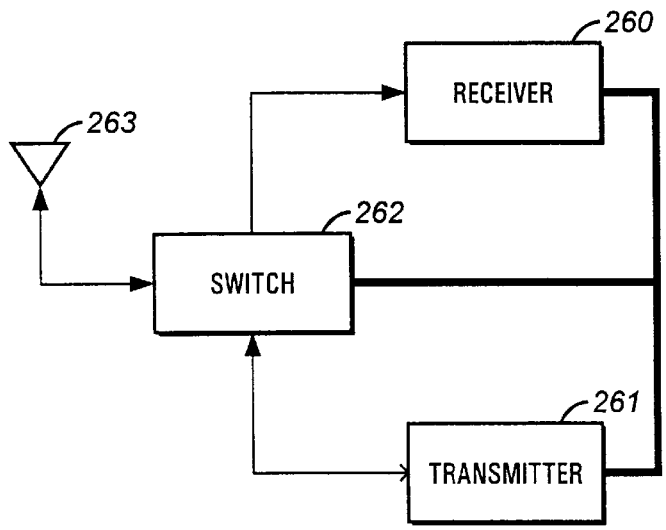
FIG. 16 is a more detailed description of the transmitter and receiver of the two-way communicating device of FIG. 1.

Turning now to FIG. 16, a more detailed diagram of the two-way communication device 9 of FIG. 1 is shown in more detail. The two-way communication device 9 has a receiver 260, a transmitter 261, and a switch 262 which is controlled by the CPU 20 via the bus of the portable computer system of FIG. 1. The switch 262 receives an input from an antenna 263 and appropriately routes the radio signal from the transmitter 261 to the antenna 263, or alternatively, the radio signal from the antenna 263 to the receiver 260 in the event the processor 20 is listening for a message. Via the bus, the processor 20 controls the receiver 260, the transmitter 261, and the switch 262 to coordinate the transmission and receipt of data packets. The receiver 260 and transmitter 261 are standard two-way paging devices or standard portable cellular communication chips available from Motorola, Inc. in Illinois or Philips Semiconductors in California. The antenna 263 is a loop antenna using flat-strip conductors such as printed circuit board wiring traces as flat strip conductors have lower skin effect loss in the rectangular conductor than that of antennas with round-wire conductors.

Figure 17:
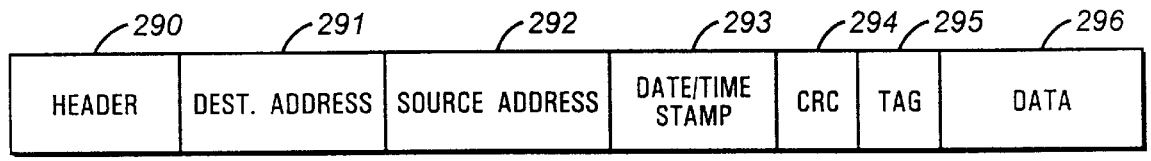
FIG. 17 is a diagram of the data packet communicated by the two-way communicating device of FIG. 1.

FIG. 17 shows the structure of the data packet to be transmitted/received to and from the two way two-way communication device 9. As shown in FIG. 17, a plurality of fields are present. These fields include a header field 290, a destination address field 291, a source address field 292, a date/time stamp field 293, a cyclic redundancy check field 294, a tag field 295 and a data field 296. As is known in the art, the header field 290 functions as a synchronization field. In the transmitting direction from the base station to the two-way communication device 9, the destination address field 291 specifies the unique address for the receiving two-way communication device. The source address field 292 in the transmitting direction from the base station to the two-way communication device 9 specifies the base station identification address, which may change to account for base station rerouting in the event that two-way communication device roaming is allowed. In the transmitting direction from the two-way communication device 9 to the base station during a reply session, the source address field 292 contains the two-way communication device 9 address to permit the base station to identify the reply pages transmitted to a previously sent page.

The date/time stamp field 293 contains data reflecting the second, minute, hour, day, month and year of the transmitted packet of FIG. 17. The date/time stamp information allows the base station to determine to send a time-out message to the individual initiating the page request in the event that the two-way communication device 9 does not timely acknowledge receipt of the page message. The cyclic redundancy check (CRC) field 294 allows the two-way communication device 9 to verify the integrity of the messages received and transmitted by the two-way communication device 9. The tag field 295 encodes the status of the data being transmitted in the data field 296. The data status includes coherency information enabling the host computer and the computer of FIG. 1 to synchronize data. The data status field carries information such as whether the data has been modified, the staleness of the data, the replacement status of the data, among others. The data field 296 is a variable length field which allows variable length messages to be transmitted to and from the two-way communication device 9.

In the two-way paging embodiment using the two-way communication device 9, the user can be paged and can reply as well. A page originator wishing to send an alphanumeric page to the user of the computer system of FIG. 1 places a call using a telephone or an originating computer. The telephone interface routes the call to the base station. The computer at the base station will either digitally or verbally query the page originator to enter an identification number such as a telephone number of the two-way communication device 9. After entry of the identification, the base station computer further prompts the page originator for the message to be sent as well as the reply identification number, or the call-back number. Upon receipt of the paging information, the base computer transmits a page message to the computer system with the two-way communication device 9 of FIG. 1, as subsequently discussed in FIG. 19.

Figure 18:
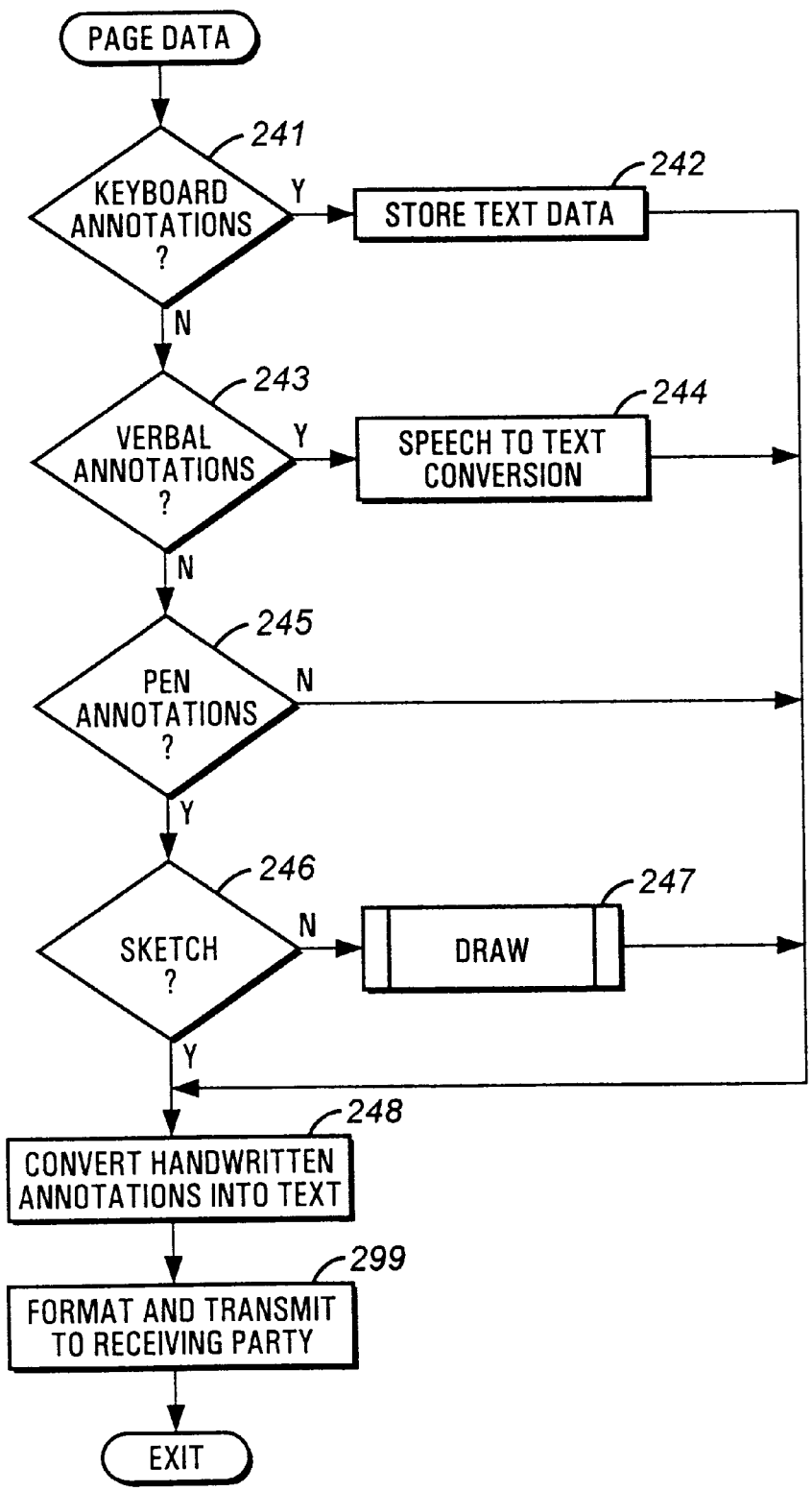
FIG. 18 is a flowchart illustrating the process of entering texts and drawings for two-way communication using the two-way communicating device of FIG. 1.

Turning now to FIG. 18, the routine to collect the reply from the user for the two-way communication system such as a two way pager or a cellular digital phone is shown. The routine of FIG. 18 shares common elements with that of FIG. 13. However the routine of FIG. 18 differs from the routine of FIG. 13 in that step 249 of FIG. 13 has been replaced with step 299 which formats and transmits the annotation to the receiving party. The routine of FIG. 18 thus enables the user to reply to a paging message or a cellular request using voice, handwritten, or typed commands and data entry.

In the event that two-way pagers are used, the present invention contemplates that the two-way communication device 9 be compatible with pACT (personal Air Communications Technology), which is an open standard developed by Cirrus Logic—PCSI and AT&T Wireless Services Inc. (Kirkland, Wash.). pACT is a narrowband, 900 Mhz range PCS technology derived from the cellular digital packet data transmission standard. pACT is optimized for applications such as acknowledgment paging, mobile e-mail, wireless Internet access, voice paging, personal home security and dispatch services. Based on the Internet IP standard. pACT provides full data encryption and authentication, enabling the efficient, full delivery of reliable and secure messages. Alternatively, in place of pACT, a REFLEX protocol from Motorola Inc. may be used. The REFLEX protocol is commercially supported by SkyNet—Mtel Corporation.

Figure 19:
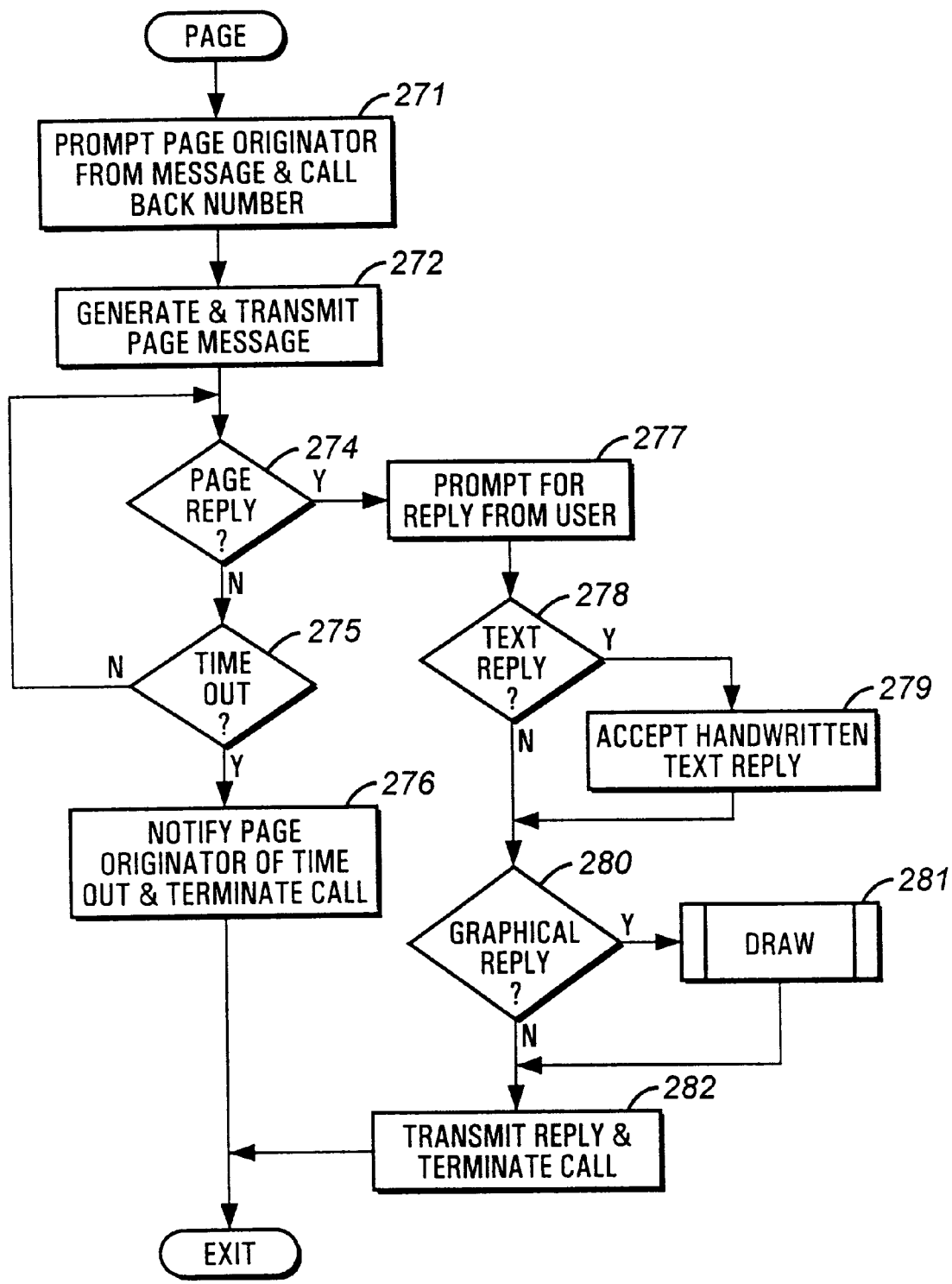
FIG. 19 is a flow chart of the two-way communication process with text and drawing using the two-way communicating device of FIG. 1.

The process of replying to a request from the page originator is shown in more detail in FIG. 19. Upon receipt of a paging call from a paging originator in step 271, the routine of FIG. 19 prompts the page originator for a message and a callback number. Next, in step 272, the routine formats/generates the page message in accordance with the format of FIG. 17 and sends the page message to the two-way communication device 9. In step 273, the base station starts the time out count down sequence and awaits for a page reply in step 274.

From step 274, if a page reply is needed, the two-way communication device 9 prompts the user for a reply message in step 277. Next, in step 278, the two-way communication device 9 checks if the user is entering a text reply. If so, the text reply could be entered by hand via the pen or a keyboard in step 279. The text reply could be entered using the miniaturized keyboard, the pen or by voice using a speech recognizer such as the voice recognizer as disclosed in pending U.S. application Ser. No. 08/461,646. Thus, data entry using the voice recognizer is interchangeable and equivalent to the pen and the keyboard can be used in place of the pen and the keyboard.

From steps 278 or 279, the routine of FIG. 18 further checks if the user is also replying with a graphical message in step 280. If so, the routine executes the draw routine of FIG. 5 in step 281. From steps 280 or 281, the two-way communication device transitions to step 282 where the message is formatted, transmitted, and the paging session terminated.

Meanwhile, on the base station end, if the page reply is expected in step 274, the base station checks periodically for a time-out. If the time-out has not expired in step 275, the routine transitions back to step 274 to wait for either the reply or the time-out event. If time out has occurred, the routine moves from step 275 to step 276 where the base station notifies the page originator of the time out. Further, from steps 276 or 282, the paging session is terminated and the routine exits. The thus disclosed two-way messaging system can flexibly handle page origination and replies with voice, keyboard, or handwritten based data entry. In the event the sketch is bit-mapped and hand-drawn, the sketched bit-map is compressed prior to transmission using the Telocator Data Protocol, specified by the Personal Communications Association and incorporated by reference. Alternatively, in the event the sketch is converted into a vector drawing file, the drawing file is already a compressed representation of the original bit-mapped drawing and data can be simply directed to the two-way communication device 9 under the Telocator Data Protocol. The thus compressed graphical information can be transmitted and routed more efficiently and reliably using the small packet size present in two-way messaging protocols.

Figure 20:
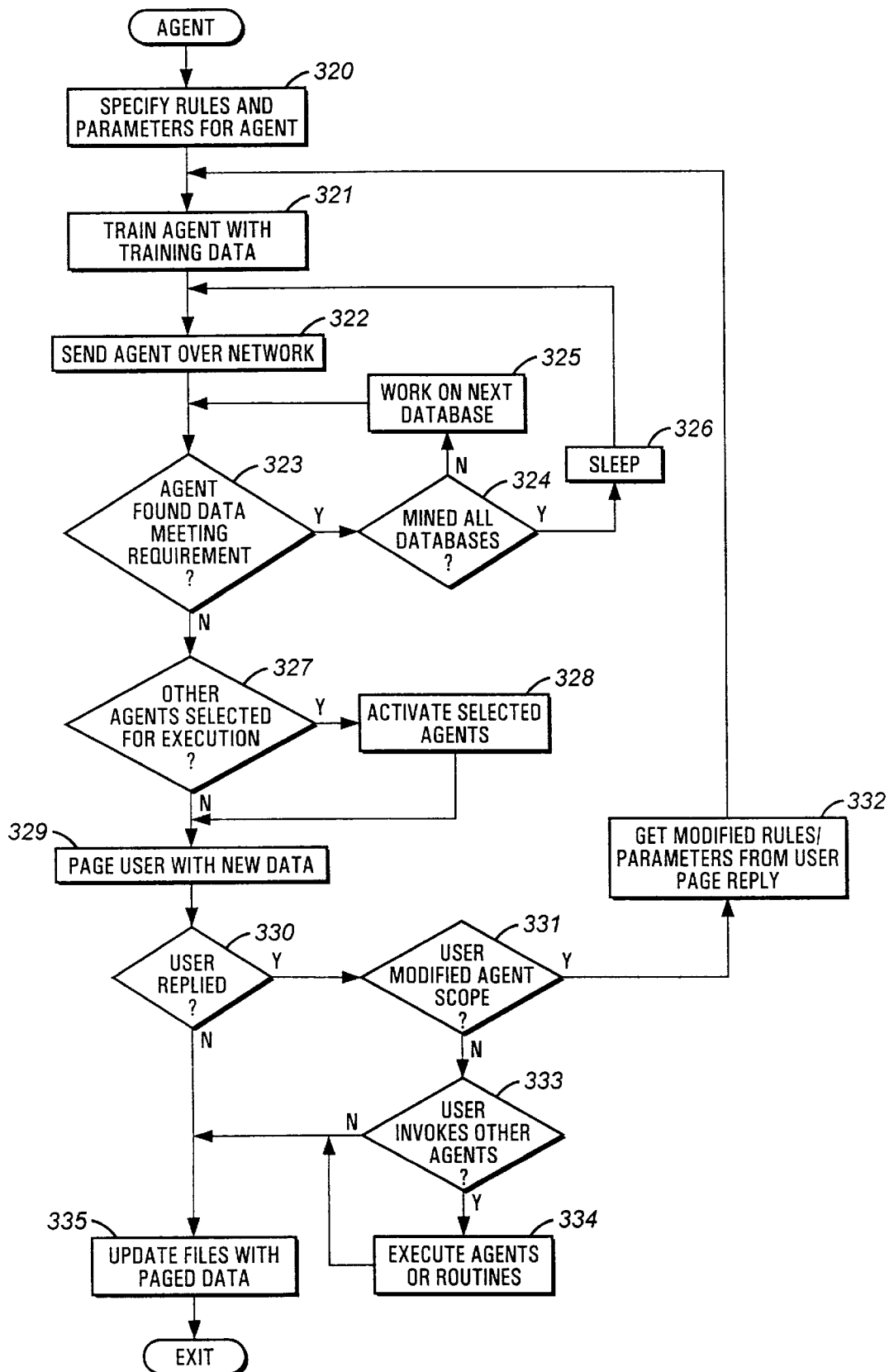
FIG. 20 is a flow chart of the process for operating an intelligent agent in conjunction with the computer system of FIG. 1.

Additionally, intelligent agents can be used in conjunction with the computer system of FIG. 1 to locate/process information over a network via the two-way communication device 9. Smart agents can automatically route user-specified data from the Web, other on-line services, and E-mail messages and faxes, to the computer of FIG. 1. In FIG. 20. a software entity called an "agent" serves as an independent source of expertise designed to perform particular tasks or sets of tasks. These agents continually process and update requests. even though the user is no longer connected to the network. These agents can also "mine" sites for information and retrieve only data relevant to the user. Further, the agents can be activated on demand to serve a particular purpose and then be deactivated after accomplishing solely that purpose. The agents navigate through computer networks such as the Internet to search for information and perform tasks for their users. The collected data from the search or the results of the execution of the tasks are compressed and delivered to the portable computer system of FIG. 1 the next time a wireless connection is established with the two-way communication device 9.

Turning now to FIG. 20, a flow chart showing the process of specifying an intelligent agent capable of operating with the two-way communication device 9 is shown. In FIG. 19, the routine accepts rules and parameters for the intelligent agent in step 320. The intelligent agent of FIG. 20 is rule driven. Rules can be specified with a simple English like syntax to set slot values, create objects, among others, and can be organized into rulebases when the rules deal with related conditions and actions. A set of rules activates when its rulebase is loaded and deactivates when the rulebase is flushed. This collection of rulebases is collectively called the "agent."

Agents can use rules to inference about the data, create new data or modify existing data. The two fundamental search strategies of these agents include forward and backward chaining. Forward chaining, which is a data driven process, proceeds from premises or data to conclusions. Alternatively, backward chaining, or goal-driven approach, proceeds from a tentative conclusion backward to the premises to determine whether the data supports that conclusion. Further, a combination of forward and backward chaining can be used to optimally solve a particular problem. Details of various expert systems suitable for use are discussed in James P. Ignizio's book *Introduction to Expert Systems—The Development and Implementation of Rule-Based Expert Systems*, hereby incorporated by reference. Additionally, the present invention contemplates that other artificial intelligence constructs, including neural networks, fuzzy logic system, and others known to those skilled in the art may be applied in place of the expert system.

In another embodiment, the intelligent agent is specified using an object oriented language such as Java, developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web and executed by a Web browser on the reader's machine. In Java, the compiler takes the instructions and generates bytecodes, which are system independent machine codes. A bytecode interpreter executes the bytecodes. The bytecode interpreter can execute stand-alone, or in the case of applets, the bytecode interpreter is built-in Java compatible browsers. The Java intelligent agent is thus free to roam the Internet and other networks with Java compatible browsers.

After the rules, strategies and parameters have been specified for the agent in step 320, the routine trains the agent in step 321 with training data, if necessary in the event that neural networks and the like are to be used in implementing the agent. Next, the routine sends the agent over a network such as the Internet in step 322. In step 323, the agent checks if the data it encountered satisfy the rules and parameters that the agent is looking for. If not, the routine proceeds to search the next database. From step 323, the routine checks if all databases have been mined in step 324. If not, the routine moves to the next database in step 325 and loops back to step 323. Alternatively, from step 324, if all databases have been mined and the agent still has not located responsive information, it puts itself to sleep in step 326. The agent periodically wakes up and broadcasts itself once more in step 322 to continue searching for responsive materials.

From step 323, in the event that responsive documents have been located, the agent checks in step 327 whether it is instructed to call other agents in step 327. If so authorized the agent invokes other agents in step 328. From step 327 or step 328. the agent reports back to the host computer which originally launched the agent. When the agent reports back with information, the host computer proceeds to page the user with the located data in step 329. In step 330, if the user replies, the routine of FIG. 20 checks if the user has modified the agent's scope in the user's reply in step 331. If so, the routine proceeds from step 331 to step 332 where it retrieves the modified rules, strategies and parameters from the user's reply. Next, the routine loops back to step 321 to repeat the search process.

Alternatively, from step 333, if the user does not modify the scope of the agent, the routine checks if the user has invoked additional agents in response to the information detected by the original agent. If so, the routine proceeds from step 333 to step 334 where the additional agents are launched or additional routines are executed. From step 330, if the user does not reply, or from steps 333 or 334, the routine updates the records in the computer of FIG. 1 with the paged data, if necessary before it exits the routine of FIG. 20. Thus, the agent of FIG. 20 can respond to the verbal, handwritten, hand-drawn, or typed command or data from the user and intelligently perform the requested action, be it a data search or various user specified actions such as retrieving cost information associated with an architectural structure hand sketched into the computer system of FIG. 1.

The present invention thus provides a convenient system for accepting and processing hand sketches and handwriting such that the user can quickly specify graphical objects on mobile pen-based computer with a relatively compact screen. The object classification and recognition capability of the present invention allows it to recognize objects being sketched by the user and to convert the hand sketches into CAD-like drawings. Further, the present invention integrates speech and typed data entry to provide a user friendly computer system. Additionally, the drawing system of the present invention can be used in conjunction with a camera to annotate pictures taken with the camera. The present invention can operate with digital cameras, APS-compatible cameras and conventional cameras which work with silver halide type films. Further, the drawing system of the present invention can be used in two-way messaging systems to support graphical paging requests and replies. The present invention also supports an intelligent agent operating with the computer to locate responsive information as specified by the drawing system of the present invention.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer system for sketching an illustration and for writing annotations by a user, said computer system comprising:

a processor;

a memory device coupled to said processor;

a display device coupled to said processor;

an input device adapted to receive a user annotation or a sketch;

a keypad coupled to said processor;

a lens coupled to said processor, said lens adapted to capture an image;

a shutter coupled to said processor;

an image sensor coupled to said processor for detecting photographic conditions;

a photographic media adapted to receive said image and said user annotation;

a non-cursive handwriting recognizer adapted to receive a predetermined set of non-cursive characters from the input device; and an encoder adapted to be coupled to said processor and to said photographic media, said encoder adapted to archive said annotation and sketch and said image onto the photographic media.

2. The computer system of claim 1, further comprising:

a library of predetermined objects including drawing elements and characters, said library storing strokes corresponding to each of said predetermined objects;

an object recognizer coupled to said input device and said library, said object recognizer identifying a best-fitting object from said library based on said strokes, said object recognizer generating a fit-value for said best-fitting object; and a handwriting recognizer coupled to said input device and said library, said handwriting recognizer identifying a best-fitting character from said library based on said strokes if said fit-value is below a predetermined threshold.

3. The computer system of claim 1, wherein said photographic media has a light-sensitive front portion adapted to face said lens and a back portion having a data storage media adapted to encode said annotation and sketch by said encoder.

4. The computer system of claim 3, wherein said photographic media is compatible with an Advanced Photographic System (APS).

5. The computer system of claim 1, wherein said photographic media is a silver halide film and wherein said encoder is an optical encoder adapted to generate a light beam directed at said photographic media.

6. The computer system of claim 1, wherein said photographic media is a magnetic disk, further comprising a light receptor device coupled to said processor for capturing and digitizing said image.

7. The computer system of claim 1, further comprising a compression engine coupled to said processor and said encoder for compressing said image before archiving said image and text onto said media.

8. The computer system of claim 1, further comprising a code adapted to receive inputs from a user, said code adapted to receiving keypad commands for adjusting said lens position for focus and said shutter to optimize the exposure of said photographic media, said code further saving said user annotation or said sketch on said photographic media.

9. The computer system of claim 1, further comprising a remote computer and a transceiver coupled to said processor, said transceiver adapted to transmit said image, said annotation and said sketch to said remote computer.

10. The computer system of claim 1, wherein said user dictates a verbal annotation to said input recognizer, said input recognizer further comprises:

a microphone coupled to said processor for capturing a verbal annotation from the user; and a speech recognizer coupled to said processor and said microphone, said speech recognizer converting said verbal annotation into text annotation.

* * * * *